US012330494B1

(12) United States Patent
Sawant et al.

(10) Patent No.: US 12,330,494 B1
(45) Date of Patent: Jun. 17, 2025

(54) COOLING SYSTEM ASSEMBLY FOR BIDIRECTIONAL VEHICLE

(71) Applicant: Zoox, Inc., Foster City, CA (US)

(72) Inventors: Rahul Dhananjay Sawant, San Mateo, CA (US); Sharosin Sean Daniels, Burlingame, CA (US); Paul Raymond Mueller, San Leandro, CA (US); Fnu Sanjay Kumar, San Jose, CA (US); Samay Shah, Oakland, CA (US); Srinivasa Rao Vaddiraju, Troy, MI (US); Qinling Zheng, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 257 days.

(21) Appl. No.: 18/087,014

(22) Filed: Dec. 22, 2022

(51) Int. Cl.
*B60K 11/08* (2006.01)
*B60K 11/06* (2006.01)
*F01P 11/16* (2006.01)

(52) U.S. Cl.
CPC .............. *B60K 11/08* (2013.01); *B60K 11/06* (2013.01); *B60K 11/085* (2013.01); *F01P 11/16* (2013.01); *F01P 2025/13* (2013.01)

(58) Field of Classification Search
CPC ........ B60K 11/08; B60K 1/06; B60K 11/085; B60K 1/02; F01P 11/16; F01P 2025/13; F01P 11/10; B60R 19/44; F16H 57/0476
See application file for complete search history.

(56) References Cited

U.S. PATENT DOCUMENTS

| 8,955,628 | B2* | 2/2015 | Murray | B60K 11/04 180/68.1 |
|---|---|---|---|---|
| 2020/0221219 | A1* | 7/2020 | Hardin | H04R 3/005 |
| 2020/0247231 | A1* | 8/2020 | Tanaka | B60K 11/085 |

FOREIGN PATENT DOCUMENTS

CN 102398494 A * 4/2012 ......... B60H 1/00392

* cited by examiner

*Primary Examiner* — Syed O Hasan
(74) *Attorney, Agent, or Firm* — Lee & Hayes, P.C.

(57) ABSTRACT

Systems and techniques for operating cooling system assemblies in a vehicle are discussed herein. The vehicle may receive a direction of travel and a speed. The vehicle may determine based on the direction of travel a leading cooling system assembly at a first end of the vehicle and a trailing cooling system assembly at a second end of the vehicle. The vehicle may determine, based on the direction of travel of the vehicle and/or whether the speed meets or exceeds a threshold speed, an action associated with the leading cooling system assembly and/or the trailing cooling system assembly and may perform the action.

17 Claims, 6 Drawing Sheets

COOLING SYSTEM ASSEMBLY FOR BIDIRECTIONAL VEHICLE

BACKGROUND

Vehicles typically include a radiator or other cooling system assembly to cool components of the vehicle. Some vehicles, such as buses, may have the cooling system assembly at its rear or trailing end. However, cooling system assemblies located on the front or leading end gets ram air when the vehicle is moving and hence receive higher airflow volume as compared to the cooling system assemblies located on the rear or trailing end. This lower air volume may result in a lower cooling capacity for the cooling system assembly at the trailing end of the vehicle. The lower cooling capacity may cause vehicle components to exhibit lower performance or damage to vehicle components (e.g., a drive unit might reduce its capacity or may fail due to overheating), reduce ride quality (e.g., due to a performance difference between sufficiently cooled vehicle components at the leading end and insufficiently cooled vehicle components at the trailing end), degrade passenger comfort due to inadequate climate control, and/or may reduce a safety and performance of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
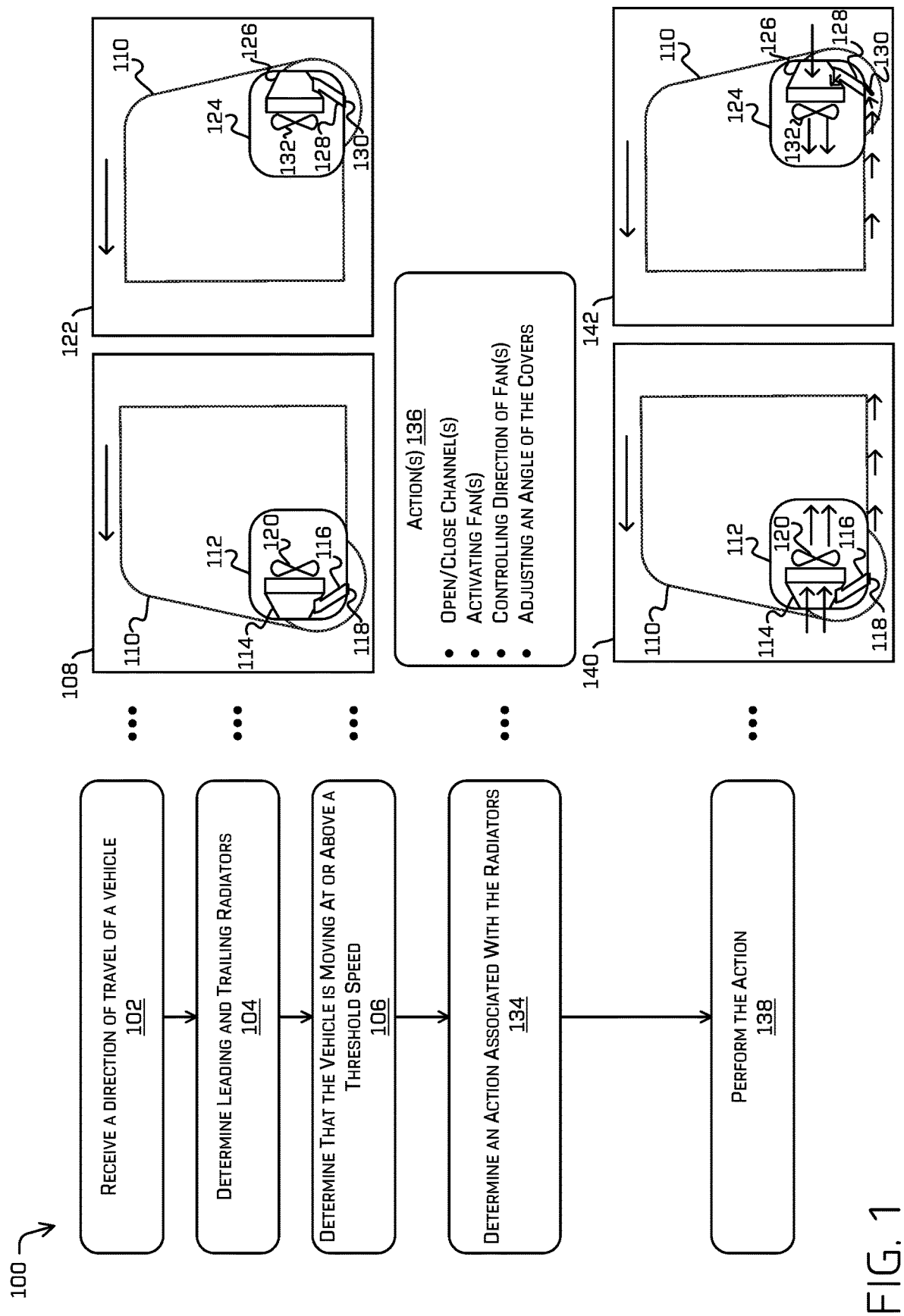
FIG. 1 is a pictorial flow diagram of an example process of operating a leading and/or a trailing cooling system assembly of a vehicle.

This application relates to systems and techniques for operating one or more cooling system assemblies in a vehicle. In some examples, the techniques described herein may be used to operate a cooling system assembly located in a rear or trailing end of a vehicle. In some examples, a cooling system assembly may include multiple components such as a heat exchanger component (e.g. a radiator), valves, fans, ducts, pipes, vent or duct covers, temperature sensors (e.g., thermostats), controllers, and the like. In some examples, the techniques described herein may be applied to operating cooling systems disposed in both front (leading) and rear (trailing) ends of a vehicle. For instance, a vehicle may include a first cooling system assembly proximate a first end of the vehicle and a second cooling system assembly proximate a second end of the vehicle. In some examples, the techniques may be applied to bidirectional vehicles which are configured to travel in a first direction wherein the first end of the vehicle is a leading end and the second end of the vehicle opposite the first end is a trailing end, and travel in a second direction opposite the first direction wherein the first end of the vehicle is the trailing end and the second end of the vehicle is the leading end. As used herein, a bidirectional vehicle can be a vehicle that can operate with one end being a leading end as the primary direction of travel between two locations and may include modifying light patterns on the trailing or leading ends to abide by local laws/regulations for headlights, stop lights, turn signals, etc. Additionally, steering operations may change such that the leading's end's axle is used as the primary steering control. Bidirectional vehicles may have symmetrical drive trains and steering systems to enable bidirectional operations (e.g., that they can travel and/or steer with similar performance envelopes regardless of direction of travel). In some examples, the techniques described herein may be used to determine the operations of the cooling systems assemblies based on a direction of travel of the vehicle. In some examples, a vehicle control system of the vehicle may determine, based on the direction of travel of the vehicle, that the first cooling system assembly is a leading cooling system assembly and that the second cooling system assembly is a trailing cooling system assembly. In some examples, the vehicle control system may determine whether the vehicle's speed meets or exceeds a threshold speed. In some examples, the vehicle control system may determine and perform one or more actions to take based on the vehicle's speed meeting or exceeding the threshold speed. Examples of such actions may include, but are not limited to, moving a cover coupled to a channel associated with trailing cooling system assembly to an open position, moving a cover coupled to a channel associated with the leading cooling system assembly to a closed, activating fan(s) associated with the cooling system assemblies, controlling a direction of the fan(s) to pull air through the cooling system assemblies or push air through the cooling system assemblies, adjusting an angle of a cover coupled to the channel associated with the trailing cooling system assembly, or the like. In some examples, the systems and the techniques for operating the cooling system assemblies may improve a cooling performance and/or a cooling capacity of the trailing cooling system assembly.

In some examples, the vehicle may be an autonomous vehicle. In some examples, the vehicle may be a bidirectional vehicle. In the scenario where the vehicle is a bidirectional vehicle, the vehicle may include a first cooling system assembly (which may include a first radiator) disposed proximate the first end and a second cooling system assembly (which may include a second radiator) disposed proximate the second end, a first channel associated with the first cooling system assembly, and a second channel associated with the second cooling system assembly.

In some examples, the first cooling system assembly may include an opening formed at a proximal end of the first cooling system assembly. In some examples, the opening may be configured to permit passage of air from an outside of the vehicle to a position at or proximate to a radiator of the first cooling system assembly. In some examples, the first channel associated with the first cooling system assembly may be configured to direct air from under the vehicle to the position at or proximate the radiator of the first cooling system assembly. In some examples, the position at or proximate the radiator of the first cooling system assembly may be a position at an inboard or proximal side of the radiator of the first cooling system assembly. In some examples, the position at or proximate the radiator of the first cooling system assembly may be a position at an outboard or distal side of the radiator of the first cooling system assembly.

In some examples, a first cover may be coupled to the first channel. In some examples, the first cover may be configured to move between a first position restricting air from entering the first channel and a second position permitting passage of air through the first channel. In some examples, a first actuator may be coupled to the first cover and configured to position the first cover in the first position to restrict air from entering the first channel when the vehicle is traveling in a first direction in which the first end of the vehicle is a leading end and/or while the vehicle is traveling below a threshold speed, and configured to position the first cover in the second position permitting passage of air through the first channel when the vehicle is traveling in a second direction in which the first end of the vehicle is a trailing end of the vehicle and/or while the vehicle is at or above the threshold speed. In some examples, the first actuator may be an active actuator (e.g., electric motor, hydraulic pump/cylinder, pneumatic actuator, or other affirmatively driven actuation system) or a passive actuator which changes position of the first cover based on movement of the vehicle in a particular direction and/or above the threshold speed (e.g., a fin or vane that presses on the first cover based on airflow pressing on the fin/vane, or a mass that moves to activate the first cover based on direction of acceleration of the vehicle).

In some examples, the second cooling system assembly may include an opening formed at a proximal end of the second cooling system assembly. In some examples, the opening may be configured to permit passage of air from an outside of the vehicle to a position at or proximate a radiator of the second cooling system assembly. In some examples, the second channel associated with the second cooling system assembly may be configured to direct air from under the vehicle to the position at or proximate the radiator of the second cooling system assembly. In some examples, the position at or proximate the radiator of the second cooling system assembly may be a position at an inboard or proximal side of the radiator of the second cooling system assembly. In some examples, the position at or proximate the radiator of the second cooling system assembly may be a position at an outboard or distal side of the radiator of the second cooling system assembly.

In some examples, a second cover may be coupled to the second channel. In some examples, the second cover may be configured to move between a first position restricting air from entering the second channel and a second position permitting passage of air through the second channel. In some examples, a second actuator may be coupled to the second cover and configured to position the second cover in the first position to restrict air from entering the second channel when the vehicle is traveling in the second direction in which the second end of the vehicle is the leading end and/or while the vehicle is traveling below the threshold speed, and configured to position the second cover in the second position permitting passage of air through the second channel when the vehicle is traveling in the first direction in which the second end of the vehicle is the trailing end of the vehicle and/or while the vehicle is at or above the threshold speed. In some examples, the second actuator may be a same or a similar actuator as the first actuator.

In some examples, the first channel is configured to direct air from under the vehicle to a position at the inboard or proximal side of the radiator of the first cooling system assembly. In some examples, the vehicle may include a third channel associated with the first cooling system assembly. In some examples, the third channel may be configured to direct air from under the vehicle to a position at the outboard or distal side of the radiator of the first cooling system assembly or to direct air from the distal side of radiator of the first cooling system assembly to a position under the vehicle. In some examples, a third cover may be coupled to the first channel and the third channel and configured to move between a first position restricting air from passing through the first channel and permitting passage of air through the third channel and a second position permitting passage of air through the first channel and restricting air from passing through the third channel. In some examples, a third actuator may be coupled to the third cover, the third actuator may be configured to position the third cover in the first position to restrict air from entering the first channel and permit passage of air through the third channel when the vehicle travels in the first direction in which the first end of the vehicle is the leading end and/or while the vehicle is below the threshold speed, and may be configured to position the third cover in the second position permitting passage of air through the first channel and restrict air from entering the third channel when the vehicle travels in the second direction in which the first end of the vehicle is the trailing end of the vehicle and/or while the vehicle is at or above the threshold speed. In some examples, the third actuator may be a same or a similar actuator as the first actuator.

In some examples, the second channel is configured to direct air from under the vehicle to a position at the inboard or proximal side of the radiator of the second cooling system assembly. In some examples, the vehicle may include a fourth channel associated with the second cooling system assembly. In some examples, the fourth channel may be configured to direct air from under the vehicle to a position at the outboard or distal side of the radiator of the second cooling system assembly or air from the distal side of the radiator of the second cooling system assembly to a position under the vehicle. In some examples, a fourth cover may be coupled to the second channel and the fourth channel and configured to move between a first position restricting air from passing through the second channel and permitting passage of air through the fourth channel, and a second position permitting passage of air through the first channel and restricting air from passing through the second channel. In some examples, a fourth actuator may be coupled to the fourth cover, the fourth actuator may be configured to position the fourth cover in the first position to restrict air from entering the second channel and permit passage of air through the fourth channel when the vehicle travels in the second direction in which the second end of the vehicle is the leading end and/or while the vehicle is below the threshold speed, and may be configured to position the fourth cover in the second position permitting passage of air through the second channel and restrict air from entering the fourth channel when the vehicle travels in the first direction in which the second end of the vehicle is a trailing end of the vehicle and/or while the vehicle is at or above the threshold speed. In some examples, the fourth actuator may be a same or a similar actuator as the first actuator.

In some examples, the first cooling system assembly may include a first fan disposed at a distal side of the radiator of first cooling system assembly. In some examples, the first fan may be configured to pull air from the environment outside of the vehicle through the opening and/or the first channel to a position at the distal side of the radiator of the first cooling system assembly, or air from under the vehicle through the first channel to the position at the distal side of the radiator of first cooling assembly. In some examples, the fan may be configured to push air from an outboard or distal side of the radiator of the first cooling system assembly through the opening and/or the first channel to the environment outside of the vehicle. In some examples, the first fan may be an assembly of two or more fans where one fan is configured to pull air from the environment outside of the vehicle through the opening and/or the first channel and the other fan is configured to push air from the outboard or distal side of the first cooling system through the opening associated with the first cooling system and/or the first channel to the environment outside of the vehicle. In some examples, the first fan may be bidirectional and configured to pull air or push air based on the rotation direction of the first fan.

In some examples, the second cooling system assembly may include a second fan disposed at a distal side of the radiator of the second cooling system assembly. In some examples, the second fan may be configured to pull air from the environment outside of the vehicle through the opening to a position at the outboard or distal side of the radiator of the second cooling system assembly or air from under the vehicle through the second channel to the position at the distal side of the radiator of the second cooling assembly. In some examples, the second fan may be configured to push air from an outboard or distal side of the radiator of the second cooling system assembly through the opening associated with the second cooling system and/or the second channel to the environment outside of the vehicle. In some examples, the second fan may be an assembly of two or more fans where one fan is configured to pull air from the environment outside of the vehicle through the opening and/or the second channel and the other fan is configured to push air from the outboard or distal side of the second cooling system through the opening associated with the second cooling system and/or the second channel to the environment outside of the vehicle. In some examples, the second fan may be bidirectional and configured to pull air or push air based on a rotation direction of the second fan.

In some examples, the vehicle may include a first sensor configured to determine a temperature of a coolant in the radiator and/or a temperature of air that passed through the radiator and are outboard or distal to the radiator. In some examples, the vehicle may include a second sensor configured to determine an ambient temperature of the environment outside of the vehicle. In some examples, the vehicle may include a third sensor configured to determine a volume of air passing through the opening associated with the first cooling system assembly. In some examples, the first actuator, second actuator, third actuator, and/or fourth actuator may be further configured to adjust an angle associated with the first cover, second cover, third cover, and/or fourth cover, respectively, based at least in part on at least one of the internal temperature, the ambient temperature, or the volume of the air passing through the opening associated with the first cooling system assembly.

Vehicle operation techniques described herein may improve a functioning of a vehicle by providing a robust method of determining and performing an action associated with a cooling system assembly based on the direction of travel of the vehicle. In the context of determining the action, the techniques discussed herein may determine the action based on whether the cooling system assembly is a leading cooling system assembly or a trailing cooling system assembly and/or whether a speed of the vehicle has met or exceeded a threshold speed. Determining and performing the action may result in safer and more optimized vehicle operations. These and other improvements to the functioning of the vehicle are discussed herein.

The techniques described herein may be implemented in a number of ways. Example implementations are provided below with reference to the following Figures. Although discussed in the context of an autonomous vehicle, the methods, apparatuses, and systems described herein may be applied to a variety of systems (e.g., a robotic platform), and are not limited to autonomous vehicles. In one example, similar techniques may be utilized in driver-controlled vehicles in which such a system may provide an indication of whether it is safe to perform various maneuvers or whether it is safe to traverse a certain distance. Also, while examples are provided in the context of a bidirectional vehicle, the techniques described herein are not limited to bidirectional vehicles and may be applied to unidirectional vehicles. For instance, the techniques described herein may be applied to vehicles having a cooling system disposed in a rear or trailing end of the vehicle. In another example, the techniques may be utilized in aviation context or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of operating a leading and/or a trailing cooling system of a vehicle.

An operation 102 may include receiving a direction of travel of a vehicle. In some examples, the vehicle may be an autonomous vehicle. In some examples, the vehicle may be a bidirectional vehicle. In some examples, the vehicle may be vehicle 110 illustrated in examples 108 and 122. Example 108 illustrates a first end of the vehicle 110, and Example 122 illustrates a second end of the vehicle 110.

Figure 3:
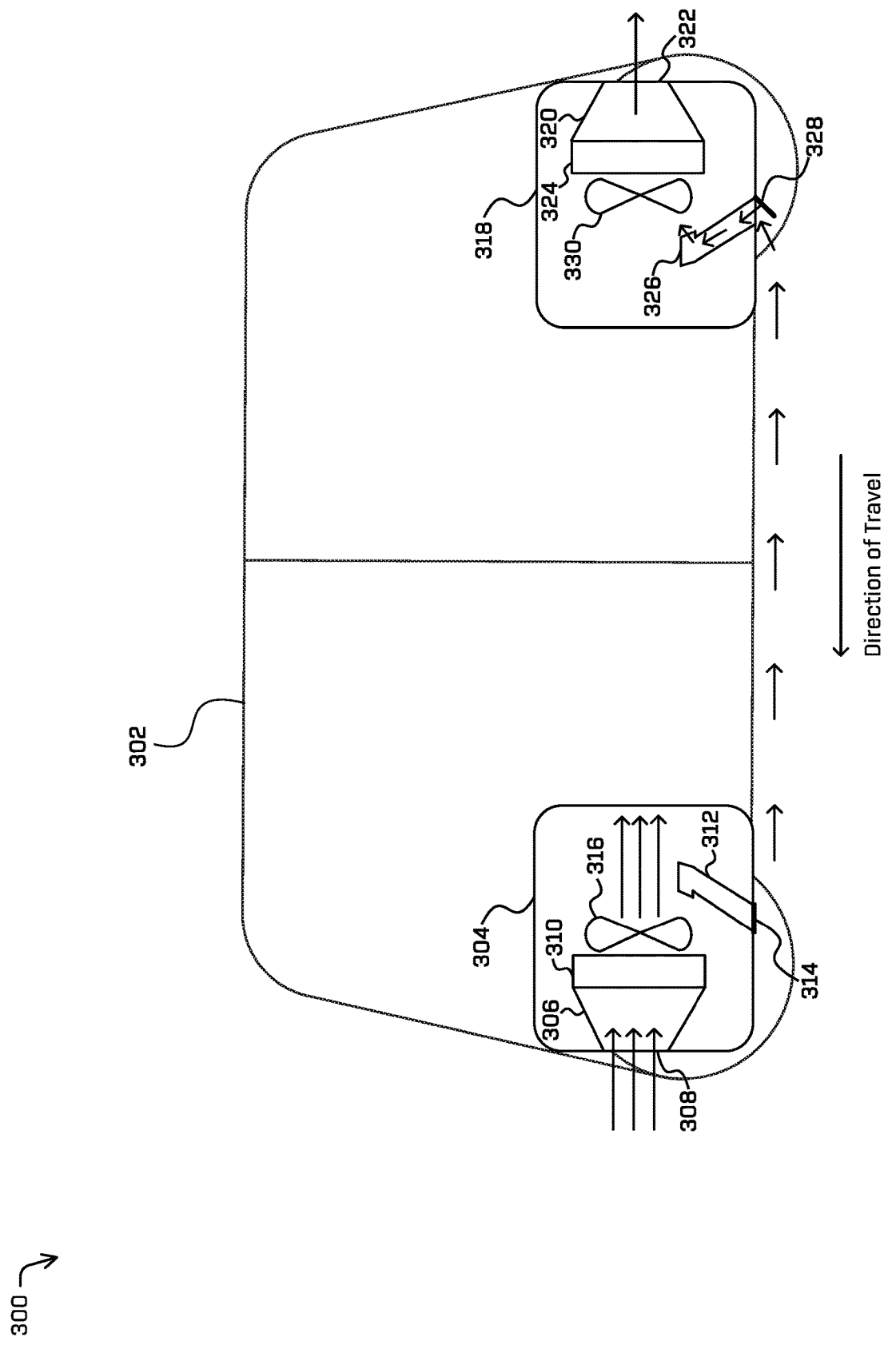
FIG. 3 is an illustration of an example vehicle including a leading cooling system assembly and a trailing cooling system assembly each with channels located at the distal side of each cooling system assembly.

Example 108 illustrates that a first cooling system assembly 112 is disposed proximate the first end of the vehicle 110. In some examples, the first end of the vehicle 110 may include a first chamber 114 (which in some examples may be inboard or proximal to a first heat exchanger component) disposed at or proximate an inboard or proximal side of the first cooling system assembly 112, a first channel 116, a first cover 118 coupled to the first channel 116, and a first fan 120. In some examples, the first fan 120 is disposed at or proximate an outboard or distal side of the first cooling system assembly 112 as illustrated in Example 108. In some examples, the first fan 120 may be disposed outboard or distal of the first exchanger component. In some examples, the first fan 120 may be disposed at or proximate the inboard or proximal side of the first cooling system assembly 112. Example 108 also illustrates that the first channel 116, when open, is configured to direct air under the vehicle to the first chamber 114 to the inboard or proximal side of the first cooling system assembly 112 as illustrated in example 108. In some examples, the first channel 116 may instead be configured to direct air under the vehicle to the outboard or distal side of the first cooling system assembly 112. An example of such a configuration is illustrated in FIG. 3. In some examples, the first channel 116 may be oriented in a direction toward the first chamber 114 as illustrated in Example 108. In some examples, the first channel 116 may be oriented in a direction toward the first fan 120. An example of such a configuration is also illustrated in FIG. 3.

Figure 4:
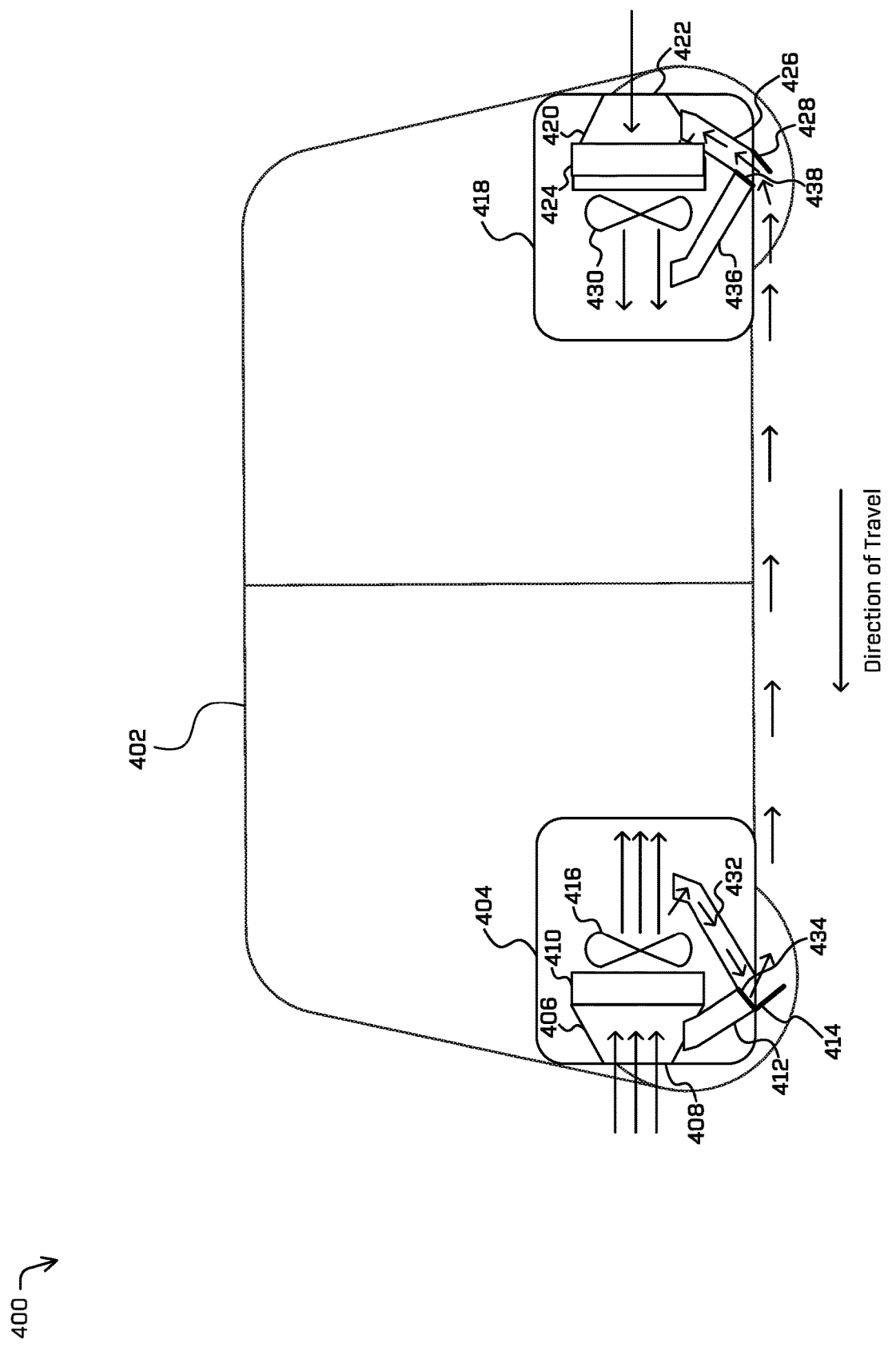
FIG. 4 is an illustration of an example vehicle including a leading cooling system assembly and a trailing cooling system assembly each with a channel located at the proximal side of each cooling system assembly and a channel located at the distal side of each cooling system assembly.

In some examples, the first cooling system assembly 112 may further include a third channel adjacent to the first channel. An example of such a configuration is illustrated in FIG. 4.

Example 122 illustrates that a second cooling system assembly 124 disposed proximate the second end of the vehicle 110. In some examples, the second end of the vehicle 110 may include a second chamber 126 (which in some examples may be inboard or proximal to a second heat exchanger component) disposed at or proximate an inboard or proximal end of the second cooling system assembly 124, a second channel 128, a second cover 130 coupled to the second channel, and a second fan 132. In some examples, the second fan 132 is disposed at or proximate an outboard or distal side of the second cooling system assembly 124 as illustrated in Example 122. In some examples, the second fan 132 may be disposed at or proximate the inboard or proximal side of the second cooling system assembly 124. In some examples, the second channel 128 may be configured to direct air from under the vehicle 110 to a position at the inboard or proximal side of the second cooling system assembly 124 as illustrated in example 122. In some examples, the second channel 128 may be configured to direct air from under the vehicle 110 to the outboard or distal side of the second cooling system assembly 124. An example of such a configuration is illustrated in FIG. 3. In some examples, the second channel 128 may be oriented in a direction toward the second chamber 126 as illustrated in Example 122. In some examples, the second channel 128 may be oriented in a direction toward the second fan 132. An example of such a configuration is also illustrated in FIG. 3. In some examples, the second cooling system assembly 124 may further include a fourth channel adjacent to the second channel. An example of such a configuration is illustrated in FIG. 4.

An operation 104 may include determining the leading and trailing cooling system assemblies. In some examples, the leading and trailing cooling system assemblies are determined based on the direction of travel of the vehicle. The arrows on top the vehicle 110 in Examples 108 and 122 illustrates that the direction of travel of the vehicle 110 is toward the first end of the vehicle. Based on the illustrated direction of travel, the first cooling system assembly 112 is determined as the leading cooling system assembly and the second cooling system assembly 124 is determined as the trailing cooling system assembly.

An operation 106 may include determining whether the vehicle 110 is moving at or above a threshold speed. In some examples, when the speed of the vehicle 110 is at or above the threshold speed, an action such as opening the second channel 128 to direct air from underneath the vehicle 110 to a position at the inboard or proximal side of the second cooling system assembly 124 may be performed. Examples of the threshold speed may be 20 km/h or 40 km/h. In some examples, the threshold speed may be a speed when at or above the threshold speed, the second cooling system assembly 124 may not be able to sufficiently cool vehicle components associated with the second end of the vehicle 110 using only air passing through an opening formed in a vehicle body of the vehicle 110 at the second end of the vehicle 110 at or proximate the inboard or distal end of the second cooling system assembly 124 and the second chamber 126 with the second channel 128 closed. In some examples, at below the threshold speed, both the first channel 116 and the second channel 128 may be closed by the first cover 118 and the second cover 130 respectively in order to minimize hot air exiting the first cooling system assembly 112 and the second cooling system assembly 124 and recirculating back into their respective cooling systems and increasing performance degradation of vehicle components cooled by the cooling systems. In some examples, at or above the threshold speed, the cooling systems would receive sufficient volumes of fresh air from outside of the vehicle to overcome any degradation from the recirculated hot air from the cooling systems.

An operation 134 may include determining, based on whether the vehicle is moving above the threshold speed, an action associated with the cooling systems (e.g. the first cooling system assembly 112 and the second cooling system assembly 124). Examples of the action are illustrated in action(s) 136 and may be, but are not limited to, opening or closing one or both of the first channel 116 and the second channel 128, activating one or both the first fan 120 and the second fan 132, controlling the direction of one or both the first fan 120 and the second fan 132 to either pull fresh air from an environment outside of the vehicle 110 into the first chamber 114 and/or the second chamber 126 or push hot air out to the environment outside of the vehicle 110 via the first chamber 114 and/or the second chamber 126, and adjusting an angle of one or both the first cover 118 and the second cover 130. In addition to the actions illustrated in action(s), other actions may also be contemplated. In some examples, multiple actions may be determined at operation 134 to be performed together at operation 138.

Additionally or alternatively, other threshold parameter may be determined and used to determine the action associated with the cooling systems. Examples of the other threshold parameters may be, but are not limited to, a threshold ambient temperature of the environment outside of the vehicle 110, a threshold thermal state of the vehicle 110, a threshold airflow volume, and the like. In some examples, the thermal state of the vehicle may be based on a temperature of a coolant in the first heat exchanger component associated with the first cooling system assembly 112 and/or a temperature of a coolant in the second heat exchanger component associated with the second cooling system assembly 124. In some examples, when the first cover 118 and/or the second cover 130 does not block the first channel 116 and/or the second channel 128 respectively (e.g., as illustrated in Example 142), the threshold speed and/or one or more of the other threshold parameters may be used to determine an angle of the first cover 118 and/or the second cover 130. In some examples, the angle of the first cover 118 and/or the second cover 130 may be determined based on the amount of cooling necessary to maintain performance of the vehicle components. For example, if a thermal state of the vehicle 110 is above the threshold thermal state, then the first cover 118 and/or the second cover 130 may be angled in such a way that would direct more air from the environment outside of the vehicle into the first cooling system assembly 112 and/or the second cooling system assembly 124. In some examples, the ambient temperature may be determined by a temperature sensor disposed proximate an outer portion of the vehicle 110. In some examples, temperature sensors may be disposed at or proximate the first heat exchanger component associated with the first cooling system assembly 112 and/or the second heat exchanger component associated with the second cooling system assembly 124 to determine the thermal state. In some examples, airflow sensors may be disposed proximate the opening formed in the vehicle body of the vehicle 110 at the first end of the vehicle 110 at or proximate the inboard or proximal end of the first cooling system assembly 112 and/or an opening formed in the vehicle body of the vehicle 110 at the second end of the vehicle 110 at or proximate the inboard or proximal end of the second cooling system assembly 124.

An operation 138 may include performing the action determined in operation 134. In some examples, the action performed may be a single action. In some examples, multiple actions may be performed together based on whether the vehicle is at or above the threshold speed and/or at or above one or more of the other threshold parameters.

Examples 140 and 142 illustrate examples of the vehicle 110 performing operations 102, 104, 106, 134, and 138. In some examples, the vehicle 110 may perform operations 102, 104, 106, 134, and 138 at a vehicle control system such as at system controller(s) 530, and in particular at radiator controller 532 illustrated in FIG. 5. The vehicle control system of the vehicle 110 may receive, at operation 102, that the vehicle 110 is traveling in a direction toward the first end of the vehicle 110 as illustrated by the arrows on top of the vehicle 110. Examples 140 and 142 illustrates that because the vehicle 110 is traveling in the direction toward the first end of the vehicle 110, there is a greater volume of fresh air (as illustrated by 2 arrows) entering from the environment outside of the vehicle 110 into the first cooling system assembly 112 than into the second cooling system assembly 124 (as illustrated by a single arrow). In some examples, this may result in the first cooling system assembly 112 being able to more effectively cool the vehicle components associated with the first end of the vehicle 110 (e.g. maintaining a lower thermal state or a lower temperature than at the second end of the vehicle 110) than at the second cooling system assembly 124.

Based on the vehicle 110's direction of travel, the vehicle control system may determine, at operation 104, that the first cooling system assembly 112 is the leading cooling system and the second cooling system assembly 124 is the trailing cooling system. The vehicle control system may then determine, at operation 106, whether the vehicle is moving at or above the threshold speed. In some examples, operation 106 may be performed before one or more of operations 102 and 104 or concurrently with one or more of operations 102 and 104. In some examples, the vehicle control system may, at operation 106, additionally or alternatively determine whether the ambient temperature of the environment outside of the vehicle is at or greater than the threshold ambient temperature, whether the thermal state of the vehicle 110 is at or greater than the threshold thermal state and/or whether the airflow of the air flowing from the outside into the first cooling system assembly 112 and/or the second cooling system assembly 124 is above the threshold airflow. The threshold speed, threshold ambient temperature, the threshold thermal state, and the threshold airflow may collective be referred to as threshold parameters. Upon performing operation 106, the vehicle control system may determine at operation 134, based on whether one or more of the threshold parameters are met or exceeded, one or more actions associated with the operation of the first cooling system assembly 112 and/or the second cooling system assembly 124.

Examples 140 illustrates that the vehicle control system may determine that the vehicle 110 is moving at a speed at or greater than the threshold speed. In some examples, the vehicle control system may also determine, using the airflow sensor, that the volume of air passing into the first chamber 114 is at or greater than the threshold airflow. In some examples, the vehicle control system may determine, based on the first cooling system assembly 112 being the leading cooling system assembly and one or more of the speed of the vehicle 110 being greater than the threshold speed or that the volume of air flowing into the first chamber 114 is at or greater than the threshold airflow, that the first channel 116 should be closed by the first cover 118. In some examples, closing the first channel 116 maximizes negative air pressure within the first chamber 114 and minimize fresh air flowing from the first chamber 114 through the first channel 116 to the outside of the vehicle 110. In some examples, the vehicle controller may determine because the vehicle 110 is traveling in the direction toward the first end of the vehicle 110, sufficient air to properly cool the vehicle components associated with the first end of the vehicle 110 will enter the first cooling system assembly 112 via the first chamber 114 without needing to open the first channel 116.

Example 142 illustrates that the vehicle controller may determine, based on the second cooling system assembly 124 being the trailing cooling system and one or more of the speed of the vehicle 110 is at or greater than the threshold speed or that the volume of air passing into the second chamber 126 is less than the threshold airflow, that the second channel 128 should be opened (e.g., the second cover 130 does not cover the second channel 128 as illustrated in Example 142). In some examples, opening the second channel 128 may provide additional airflow into the second chamber 126 wherein the total airflow into the second chamber 126 provides sufficient air to properly cool the vehicle components associated with the second end of the vehicle 110 as illustrated by the two arrows past the second fan 132. In some examples, the vehicle control system may further determine the angle of the second cover 130 based on whether the ambient temperature outside of the vehicle is at or greater than the threshold ambient temperature, whether the thermal state of the vehicle 110, particular the thermal state at the second end of the vehicle 110, is at or greater than the threshold thermal state, and/or whether the volume of airflow into the second chamber 126 is at or greater than the threshold airflow. For example, if the vehicle control system determines that the thermal state is at or greater than threshold thermal state (e.g., more fresh air is needed to sufficiently cool the vehicle components), the vehicle control system may adjust the second cover 130 to a more obtuse angle (e.g., closer to 90 degrees) to direct more air into the second channel 128. For example, if the vehicle control system determines the opposite, then the vehicle control system may adjust the second cover 130 to a more acute angle (e.g., closer to 0 degrees) to direct less air into the second channel 128. In some examples, multiple thresholds may be used such as a first threshold thermal state, a second threshold thermal state that is higher than the first threshold thermal state, wherein the angle of the second cover 130 associated with the first threshold thermal state may be more acute than the angle of the second cover 130 associated with the second threshold thermal state.

Figure 2:
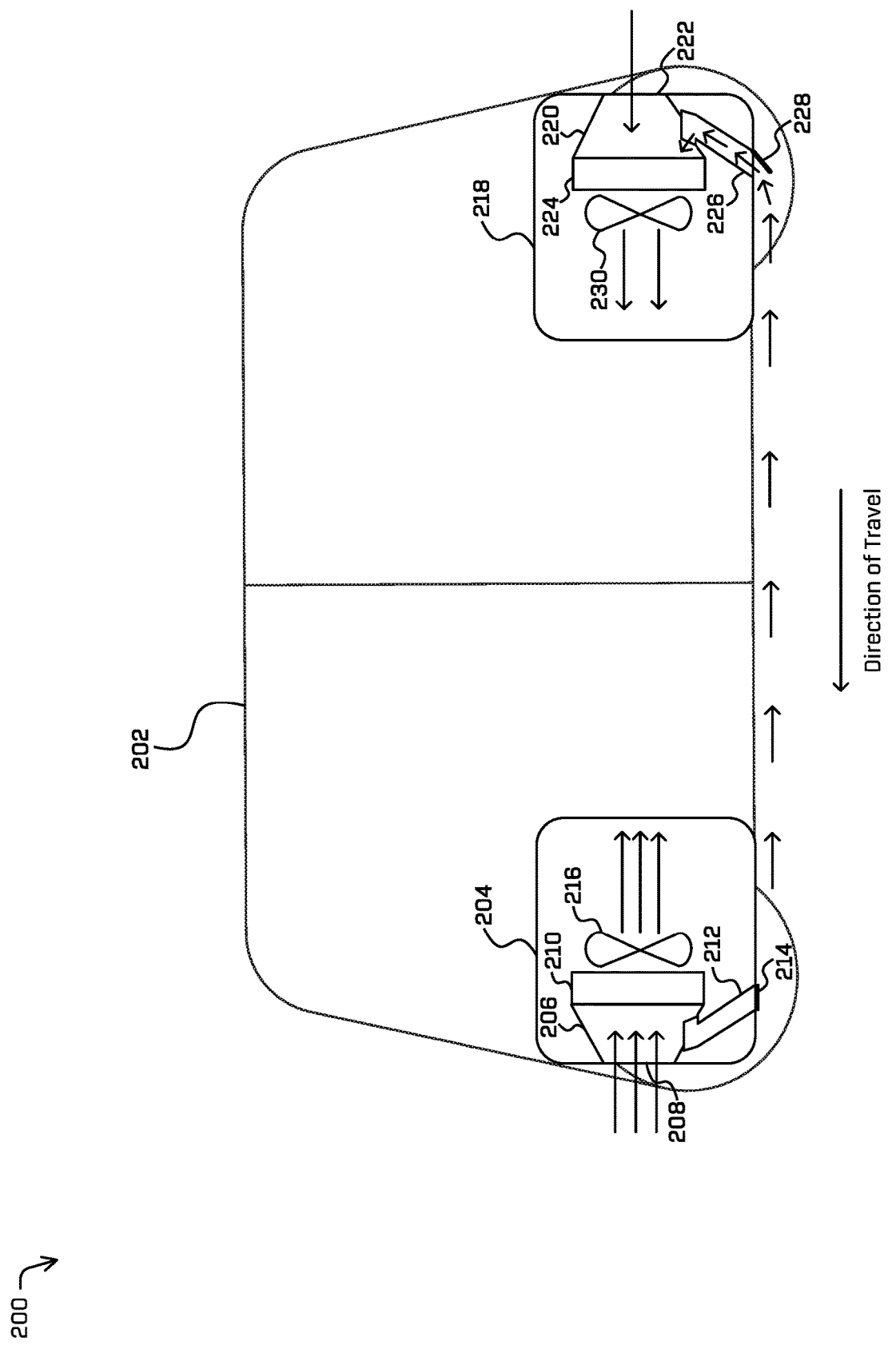
FIG. 2 is an illustration of an example vehicle including a leading cooling system assembly and a trailing cooling system assembly each with channels located at the proximal side of each cooling system assembly.

FIG. 2 is an illustration of an example 200 of a vehicle that has a leading cooling system assembly and a trailing cooling system assembly each with channels located at an inboard or proximal side of each cooling system.

Example 200 includes a vehicle 202, a first cooling system assembly 204 at or proximate a first end of the vehicle 202, and a second cooling system assembly 218 at or proximate a second end of the vehicle 202. The first end of the vehicle 202 includes a first chamber 206 disposed at or proximate the proximal side of the first cooling system assembly 204, a first opening 208 formed in a vehicle body of the vehicle 202 at the first end of the vehicle 202 proximate the first cooling system assembly 204, a first channel 212 configured to direct air from under the vehicle 202 to a position at an inboard or proximal side of the first cooling system assembly 204, a first cover 214 coupled to the first channel 212, and a first fan 216 disposed at the distal side of the first cooling system assembly 204. In some examples, the first chamber 206 is located between the first opening 208 that is inboard or proximal to the first chamber 206 and a first heat exchanger component 210 that is outboard or distal to the first chamber 206. In some examples the first heat exchanger component 210 may be, but is not limited to, a radiator, a finned heat exchanger, a tube heat exchanger, a plate heat exchanger, or the like. The first heat exchanger component 210 may include fluid such as coolant or may be air cooled by radiation to an environment. The second end of the vehicle 202 includes a second chamber 220 disposed at or proximate an inboard or proximal side of the second cooling system assembly 218, a second opening 222 formed in the vehicle body of the vehicle 202 at the second end of the vehicle 202 proximate the first cooling system assembly 204, a second channel 226 configured to direct air from under the vehicle to a position at an inboard or proximal side of the second cooling system assembly 218, a second cover 228 coupled to the second channel 226, and a second fan 230 disposed at a distal end of the second cooling system assembly 218. In some examples, the second chamber 220 is located between the second opening 222 that is inboard or proximal to the second chamber 220 and a second heat exchanger component 224 that is outboard or distal to the second chamber 220. In some examples, the second heat exchanger component 224 may be a similar or a same heat exchanger component as the first heat exchanger component 210. In some examples, the vehicle 202, the first cooling system assembly 204 and its components and the second cooling system assembly 218 and its components may be the same or similar to the vehicle 110, the first cooling system assembly 112 and its components, and the second cooling system assembly 124 and its components illustrated in FIG. 1. In example 200, because the direction of travel of the vehicle 202 is toward the first end of the vehicle 202, the first cooling system assembly 204 is the leading cooling system assembly and the second cooling system assembly 218 is the trailing cooling system assembly. Furthermore, example 200 illustrates the operations of the vehicle 202 when it is traveling at or above a threshold speed.

Operationally, with reference to the first cooling system assembly 204 when the first channel 212 is closed by the first cover 214, fresh air from an environment outside of the vehicle 202 is drawn into the first chamber 206 through the first opening 208. This is illustrated in FIG. 2 as the three arrows entering the first chamber 206 through the first opening 208. In some examples, the fresh air may be pulled into the first chamber 206 by activating the first fan 216. In some examples, the first fan 216 may pull the fresh air (as illustrated by three arrows behind the first fan 216) through the first chamber 206 and the first heat exchanger component 210 toward an inboard or distal end of the first cooling system assembly 204. In some examples, the first heat exchanger component 210 may be a radiator and may include one or more radiator pipes containing fluid (e.g., coolant) which may be at a hot temperature and one or more openings. In some examples, as the fresh air passes over the one or more radiator pipes and through the one or more openings, the fresh air lowers the temperature of the fluid inside the one or more radiator pipes. In some examples, as a result, a temperature of the fresh air after passing through the radiator core becomes higher than a temperature of the fresh air from the environment outside and air inboard or proximal to the first heat exchanger component 210 becomes heated air (e.g., the temperature of the fresh air at the arrows at the first opening 208 is lower than the temperature of the heated air at the arrows inboard or distal the first fan 216). In some examples, the first cooling system assembly 204 may further include one or more openings at the inboard or distal end of the first cooling system assembly 204 where the heated air may exit the first cooling system assembly 304 to the environment outside of the vehicle 202 and/or into a passenger cabin of the vehicle 202. In some examples, the second cooling system assembly 218 may use the fresh air from outside of the vehicle 202 to lower the temperature of fluid at the second heat exchanger component 224 in the same or similar manner as the first cooling system assembly 204 while the second channel 226 is closed by the second cover 228.

In example 200, because the vehicle 202 is traveling in the direction toward the first end of the vehicle 202, a greater volume of air enters the first chamber 206 from the environment outside of the vehicle 202 than at the second chamber 220 (illustrated by three arrows entering the first chamber 206 and one arrow entering the second chamber 220). In some examples, this may result in vehicle components associated with the first end of the vehicle 202 being sufficiently cooled and exhibiting minimum to no performance degradation while vehicle components associated with the second end of the vehicle 202 may be insufficiently cooled and thus exhibit greater performance degradation than the vehicle components associated with the first end of the vehicle 202. As a result, in order to provide sufficient airflow through the second cooling system assembly 218 to sufficiently cool the vehicle components at the second end of the vehicle 202, the second cover 228 may be moved from a first position wherein the second cover 228 is positioned to prevents air from entering the second channel 226 (e.g., the position of the first cover 214 illustrated in FIG. 2) to a second position wherein the second cover 228 is positioned to direct air into the second channel 226 (e.g., the position of the second cover 228 illustrated in FIG. 2). In some examples, the first channel 212 and/or the second channel 226 may direct fresh air from the under the vehicle 202 as illustrated in FIG. 2 into the first chamber 206 and/or the second chamber 220 respectively. In some examples, both first channel 212 and the second channel 226 may have an opening associated with the first cover 214 and the second cover 228 respectively and an opening associated with the first chamber 206 and the second chamber 220 respectively. In some examples, the first channel 212 and/or the second channel 226 may direct fresh air from left side of the vehicle 202, the right side of the vehicle 202, or the top of the vehicle 202 instead of from under the vehicle 202. In some examples, rather than the first channel 212 and the second channel 226's respective openings being flush with a surface of the vehicle 202 as illustrated in FIG. 2, the first channel 212 and/or the second channel 226 may protrude from the surface of the vehicle 202. In some examples, rather than the first channel 212 and the second channel 226 having a uniform shape throughout as illustrated in FIG. 2, the first channel 212 and/or the second channel 226 may be funnel shaped wherein a size of the openings associated with the first cover 214 and/or the second cover 228 is larger than a size of the openings associated with the first chamber 206 and/or the second chamber 220 and the size of the first channel 212 and/or the second channel 226 gradually narrows from the size of the openings associated with the first cover 214 and/or the second cover 228 to the size of the openings associated with the first chamber 206 and/or the second chamber 220. In some examples, a speed of the first fan 216 and/or the second fan 230 may be adjusted to change the volume of fresh air entering into the first chamber 206 and/or the second chamber 220 respectively.

In some examples, the vehicle 202 may further include one or more ambient temperature sensors to detect the ambient temperature of the outside of the vehicle 202. In some examples, the first cooling system assembly 204 and/or the second cooling system assembly 218 may further include one or more temperature sensors configured to detect the temperature of the heated air inside the first cooling system assembly 204 and/or the second cooling system assembly 218 respectively and inboard or distal of the first fan 216, the second fan 230, the first heat exchanger component 210, and/or the second heat exchanger component 224. In some examples, the one or more temperature sensor may be at or proximate the first heat exchanger component 210 and/or the second heat exchanger component 224 and configured to detect the temperature of the fluid in the first heat exchanger component 210 and/or the temperature of the fluid in the second heat exchanger component 224. In some examples, the temperature of the heated air and/or temperature of the fluid in the heat exchanger components at the first cooling system assembly 204 and/or the second cooling system assembly 218 may be used to determine a thermal state associated with the first cooling system assembly 204 and/or a thermal state associated with the second cooling system assembly 218 respectively, wherein a higher temperature is indicative of a higher thermal state and a lower temperature is indicative of a lower thermal state. In some examples, the first cooling system assembly 204 and/or the second cooling system assembly 218 may further include one or more airflow sensors configured to detect the volume of fresh air entering the first chamber 206 and/or the second chamber 220 from the environment outside of the vehicle 202.

In some examples, the second cover 228 may be coupled to an actuator configured to move the second cover 228 from the first position to the second position. In some examples, the actuator may be an active actuator or a passive actuator as described throughout this disclosure. In some examples, the second position of the second cover 228 may be a fixed angle wherein when the second cooling system assembly 218 is the trailing cooling system assembly and the speed of the vehicle 202 meets or exceeds the threshold speed, the actuator is configured to always move the second cover 228 to the fixed angle. In some examples, the actuator may be configured to dynamically adjust the angle of the second position of the second cover 228 to fixed angles between the first position (e.g., 0 degrees) and a second angle (e.g. 90 degrees, 180 degrees, or the like) or to all angles between the first position and the second angle. In some examples, the angle of the second position may be determined based on the thermal state associated with second cooling system assembly 218. In some examples, the angle of the second position may be based on one or more threshold thermal states. In some examples, the angle of the second position may be adjusted between a first thermal state angle associated with a first threshold thermal state and a second thermal state angle associated with a second thermal state wherein the first thermal state angle is more acute than the second thermal state angle (e.g., closer to 0 degrees (the first position) than the second thermal state angle) and the first thermal state is associated with a lower temperature than the second thermal state. In some examples, the angle of the second position of the second cover 228 may be adjusted based on the ambient temperature and/or whether the ambient temperature meets or exceeds one or more threshold ambient temperatures. In some examples, the first cover 214 may also include an actuator and that actuator may be configured to move the first cover 214 in the same or similar way as described with respect to the second cover 228.

In some examples, the speed of the first fan 216 and/or the second fan 230 may be adjusted based on whether the first cooling system assembly 204 is the leading cooling system assembly or whether second cooling system assembly 218 is the leading cooling system assembly. For example, because the second cooling system assembly 218 is the trailing cooling system assembly and thus would have less volume of fresh air passively entering the second chamber 220 than the volume of fresh air passively entering the first chamber 206, the speed of the second fan 230 may be adjusted be higher than the speed of the first fan 216. In some examples, the speed of the first fan 216 and/or the second fan 230 may be adjusted based on whether the volume of the fresh air detected by the one or more airflow sensors exceeds one or more threshold airflow volume. In some examples, the speed of the first fan 216 and/or the second fan 230 may be adjusted based on the thermal state associated with the first cooling system assembly 204 and/or the thermal state associated with the second cooling system assembly 218 and may further be based on whether the thermal state associated with the first cooling system assembly 204 and/or the thermal state associated with the second cooling system assembly 218 meets or exceeds one or more threshold thermal states. In some examples, the threshold thermal state(s) associated with the fans may be the same as the threshold thermal state(s) associated with the covers. In some examples, the threshold thermal state(s) associated with the fans may be different than the threshold thermal state(s) associated with the covers.

In some examples, the vehicle 202 may be a bidirectional vehicle, thereby may travel in a direction opposite the direction of travel illustrated in Example 200 without turning the vehicle 202 around (e.g., the second end of the vehicle 202 becomes the leading end and the first end of the vehicle 202 becomes the trailing end). In the example where the vehicle 202 is traveling in the direction opposite the direction of travel illustrated in Example 200, the second cooling system assembly 218 would become the leading cooling system assembly and the first cooling system assembly 204 would become the trailing cooling system assembly. In such a scenario, the second cooling system assembly 218, as the leading cooling system, would operate in a same or similar manner as the first cooling system assembly 204 as described above and the first cooling system assembly 204, as the trailing cooling system would operate in a same or similar manner as the second cooling system assembly 218 as described above.

FIG. 3 is an illustration of an example 300 of a vehicle including a leading cooling system assembly and a trailing cooling system assembly each with channels located at a distal side of each cooling system.

Example 300 includes a vehicle 302, a first cooling system assembly 304 located at a first end of the vehicle 302, and a second cooling system assembly 318 located at a second end of the vehicle 302.

The first end of vehicle 302 includes a first chamber 306 dispose at or proximate a proximal side of the first cooling system assembly 304, a first opening 308 formed in a vehicle body of the vehicle 302 at the first end of the vehicle 302 proximate the first cooling system assembly 304, a first channel 312 configured to direct air from under the vehicle 302 to a position at an outboard or distal side of the first cooling system assembly 304 or to direct air from the outboard or distal side of the first cooling system assembly 304 to a position under the vehicle 302, a first cover 314 coupled to the first channel 312, and a first fan 316 disposed at the outboard or distal side of the first cooling system assembly 304. In some examples, the first chamber 306 may be located between the first opening 308 that is inboard or proximal to the first chamber 306 and a first heat exchanger component 310 that is outboard or distal to the first chamber 306. The second end of the vehicle 302 includes a second chamber 320 dispose at or proximate an inboard or proximal side of the second cooling system assembly 318, a second opening 322 formed in the vehicle body of the vehicle 302 at the second end of the vehicle 302 proximate the first cooling system assembly 304, a second channel 326 configured to direct air from under the vehicle 302 to a position at an outboard or distal side of the second cooling system assembly 318 or to direct air from the outboard or distal side of the second cooling system assembly 318 to a position under the vehicle 302, a second cover 328 coupled to the second channel 326, and a second fan 330 disposed at the distal side of the second cooling system assembly 318. In some examples, the second chamber 320 is located between the second opening 322 that is inboard or proximal to the second chamber 320 and a second heat exchanger component 324 that is outboard or distal to the second chamber 320. The first heat exchanger component 310 and/or the second heat exchanger component 324 may be a similar or a same heat exchange element as those described in connection with FIG. 2, as well as throughout this disclosure. In example 300, because the direction of travel of the vehicle 302 is toward the direction of the first end of the vehicle 302, the first cooling system assembly 304 is the leading cooling system assembly and the second cooling system assembly 318 is the trailing cooling system assembly.

Operationally, at the first cooling system assembly 304, fresh air from an environment outside of the vehicle 302 is drawn into the first chamber 306 through the first opening 308. This is illustrated in FIG. 3 as the three arrows entering the first chamber 306 through the first opening 308. In some examples, the fresh air may be pulled into the first chamber 306 by activating the first fan 316. In some examples, the first fan 316 may pull the fresh air (as illustrated by three arrows behind the first fan 316) through the first chamber 306 and the first heat exchanger component 310 toward an inboard or distal end of the first cooling system assembly 304. In some examples, the first heat exchanger component 310 may be a first radiator and may include one or more radiator pipes containing fluid (e.g., coolant) which may be at a hot temperature and one or more openings. In some examples, as the fresh air passes over the one or more pipes and through the one or more openings, the fresh air lowers the temperature of the fluid inside the one or more radiator pipes. In some examples, as a result, a temperature of the fresh air after passing through the first heat exchanger component 310 becomes higher than a temperature of the fresh air from the environment outside and air outboard or distal to the first heat exchanger component becomes heated air (e.g., the temperature of the fresh air at the arrows at the first opening 308 is lower than the temperature of the heated air at the arrows inboard or distal of the first fan 316). In some examples, the first cooling system assembly 304 may further include one or more inboard or distal openings at the inboard or distal end of the first cooling system assembly 304 where the heated air may exit the first cooling system assembly 304 to the environment outside of the vehicle 302 and/or into a passenger cabin of the vehicle 202.

At the second cooling system assembly 318, example 300 illustrates that the fresh air (represented by the arrows under the vehicle 302) may enter the second cooling system assembly 318 via the second channel 326 to a position at the inboard or distal side of the second cooling system assembly 318. In some examples, the second channel 326 is always open while the vehicle is in motion. Example 300 further illustrates that the fresh air passes through the second heat exchanger component 334. In some examples, the second heat exchanger component 334 may be the same or similar as the first heat exchanger component 310 and may be a radiator and include one or more radiator pipes containing fluid which may be at a hot temperature and one or more openings. In some examples, as the fresh air passes over the one or more pipes and through the one or more openings, the fresh air lowers the temperature of the fluid inside the one or more radiator pipes of the second heat exchanger component 324. In some examples, as a result, a temperature of the fresh air after passing through the heat exchanger component 310 becomes higher than a temperature of the fresh air from the environment outside and air inboard or proximal to the second heat exchanger component 334 becomes heated air. Example 300 further illustrates that the heated air travels through the second chamber 320 and to the environment outside via the second opening 322. In some examples, the second fan 330 is off and the second heat exchanger component 324 is passively cooled by the fresh air via the second channel 326. In some examples, the second fan 330 may be activated for active cooling of the second heat exchanger component 324.

In some examples, the vehicle 302 may further include one or more ambient temperature sensors to detect the ambient temperature of the outside of the vehicle 302. In some examples, the first cooling system assembly 304 and/or the second cooling system assembly 318 may further include one or more temperature sensors configured to detect the temperature of the heated air inside the first cooling system assembly 304 and/or the second cooling system assembly 318 respectively inboard or distal of the first fan 316, the second fan 330, the first heat exchanger component 310, and/or the second heat exchanger component 324. In some examples, the one or more temperature sensor may be at or proximate the first heat exchanger component 310 and/or the second heat exchanger component 324 and configured to detect the temperature of the fluid in the first heat exchanger component 310 and/or the temperature of the fluid in the second heat exchanger component 324. In some examples, the temperature of the heated air and/or the temperature of the fluid in the heat exchanger components at the first cooling system assembly 304 and/or the second cooling system assembly 318 may be used to determine a thermal state associated with the first cooling system assembly 304 and/or a thermal state associated with the second cooling system assembly 318 respectively, wherein a higher temperature is indicative of a higher thermal state and a lower temperature is indicative of a lower thermal state. In some examples, the first cooling system assembly 304 and/or the second cooling system assembly 318 may further include one or more airflow sensors configured to detect the volume of fresh air entering the first chamber 306 and/or the second chamber 320 from the environment outside of the vehicle 302.

In some examples, the second cover 328 may be coupled to an actuator configured to move the second cover 328 from a first position, whereby the second cover 328 fully covers the second channel 326 to close the second channel 326 and prevent the fresh air from entering the second channel 326 to a second position whereby the second cover 328 does not cover the second channel 326. Example 300 illustrates the second cover 328 in the second position. In some examples, the actuator may be an active actuator or a passive actuator as described throughout this disclosure. In some examples, the second position of the second cover 328 may be a fixed angle wherein when the second cooling system assembly 318 is the trailing cooling system and the vehicle 302 is moving, the actuator is configured to always move the second cover 328 to the fixed angle. In some examples, the actuator may be configured to dynamically adjust the angle of the second position of the second cover 328 to fixed angles between the first position (e.g., 0 degrees) and a second angle (e.g. 90 degrees, 180 degrees, or the like) or to all angles between the first position and the second angle. In some examples, the angle of the second position may be determined based on the thermal state associated with second cooling system assembly 318. In some examples, the angle of the second position may be based on one or more threshold thermal states. In some examples, the angle of the second position may be adjusted between a first thermal state angle associated with a first threshold thermal state and a second thermal state angle associated with a second thermal state wherein the first thermal state angle is more acute than the second thermal state angle (e.g., closer to 0 degrees (the first position) than the second thermal state angle) and the first thermal state is associated with a lower temperature than the second thermal state. In some examples, the angle of the second position of the second cover 328 may be adjusted based on the ambient temperature and/or whether the ambient temperature meets or exceeds one or more threshold ambient temperatures. In some examples, the first cover 314 may also include an actuator and that actuator may be configured to move the first cover 314 in the same or similar way as described with respect to the second cover 328.

In some examples, the speed of the first fan 316 and/or the second fan 330 may be adjusted based on whether the first cooling system assembly 304 is the leading cooling system or whether second cooling system assembly 318 is the leading cooling system assembly. For example, because the second cooling system assembly 318 is the trailing cooling system assembly and thus would have less volume of fresh air passively entering the second chamber 320 than the volume of fresh air passively entering the first chamber 306, the speed of the second fan 330 may be adjusted be higher than the speed of the first fan 316. In some examples, the speed of the first fan 316 and/or the second fan 330 may be adjusted based on whether the volume of the fresh air detected by the one or more airflow sensors exceeds one or more threshold airflow volume. In some examples, the speed of the first fan 316 and/or the second fan 330 may be adjusted based on the thermal state associated with the first cooling system assembly 304 and/or the thermal state associated with the second cooling system assembly 318 and may further be based on whether the thermal state associated with the first cooling system assembly 304 and/or the thermal state associated with the second cooling system assembly 318 meets or exceeds one or more threshold thermal states. In some examples, the threshold thermal state(s) associated with the fans may be the same as the threshold thermal state(s) associated with the covers. In some examples, the threshold thermal state(s) associated with the fans may be different than the threshold thermal state(s) associated with the covers.

In some examples, the vehicle 302 may be a bidirectional vehicle, thereby may travel in a direction opposite the direction of travel illustrated in example 300 without turning the vehicle 302 around (e.g., the second end of the vehicle 302 becomes the leading end and the first end of the vehicle 202 becomes the trailing end). In the example where the vehicle 302 is traveling in the direction opposite the direction of travel illustrated in example 300, the second cooling system assembly 318 would become the leading cooling system and the first cooling system assembly 304 would become the trailing cooling system. In such a scenario, the second cooling system assembly 318, as the leading cooling system, would operate in a same or similar manner as the first cooling system assembly 304 as described above and the first cooling system assembly 304, as the trailing cooling system would operate in a same or similar manner as the second cooling system assembly 318 as described above.

FIG. 4 is an illustration of an example 400 illustrating a vehicle 402 that has a leading cooling system assembly and a trailing cooling system assembly each with a channel located at an inboard or proximal side of each cooling system and a channel located at an outboard or distal side of each cooling system.

Example 400 includes a vehicle 402, a first cooling system assembly 404 located at a first end of the vehicle 402 and a second cooling system assembly 418 located at a second end of the vehicle 202.

The first end of the vehicle 402 includes a first chamber 406 disposed at or proximate an inboard or proximal side of the first cooling system assembly 404, a first opening 408 formed in a vehicle body of the vehicle 402 at the first end of the vehicle 402 proximate the first cooling system assembly 404, a first channel 412 configured to direct air from under the vehicle 402 to a position at the inboard or proximal side of the first cooling system assembly 404 or direct air from the inboard or proximal side of the first cooling system assembly 404 to a position under the vehicle 402, a first cover 414 coupled to the first channel 412, a first fan 416 disposed at the outboard or distal side of the first cooling system assembly 404, a third channel 432 configured to direct air from under the vehicle 402 to a position at the outboard or distal side of the first cooling system assembly 404 or to direct air from the outboard or distal side of the first cooling system assembly 404 to a position under the vehicle 402, and a third cover 434 coupled to the first channel 412 and the third channel 432. In some examples, the first chamber 406 may be located between the first opening 408 that is inboard or proximal to the first chamber 406 and a first heat exchanger component 410 that is outboard or distal to the first chamber 406. The second end of the vehicle 402 includes a second chamber 420 disposed at or proximate an inboard or proximal side of the second cooling system assembly 418, a second opening 422 formed in the vehicle body of the vehicle 402 at the second end of the vehicle 402 proximate the first cooling system assembly 404, a second channel 426 configured to direct air from under the vehicle 402 to a position at an inboard or proximal side of the second cooling system assembly 418 or to direct air from the inboard or proximal side of the second cooling system assembly 418 to a position under the vehicle 402, a second cover 428 coupled to the second channel 426, a second fan 430 disposed at the outboard or distal side of the second cooling system assembly 418, a fourth channel 436 configured to direct air from under the vehicle 402 to a position at the outboard or distal side of the second cooling system assembly 418 or to direct air from the outboard or distal side of the second cooling system assembly 418 to a position under the vehicle 402, and a fourth cover 438 coupled to the second channel 426 and the fourth channel 436. In some examples, the second chamber 420 is located between the second opening 422 that is inboard or proximal to the second chamber 420 and a second heat exchanger component 424 that is outboard or distal to the second chamber 420. The first heat exchanger component 410 and/or the second heat exchanger component 424 may be a similar or a same heat exchange element as those described in connection with FIG. 2, as well as throughout this disclosure. In example 400, because the direction of travel of the vehicle 402 is toward the first end of the vehicle 402, first cooling system assembly 404 is the leading cooling system assembly and the second cooling system assembly 418 is the trailing cooling system assembly. Furthermore, Example 400 illustrates the operations of the vehicle 402 when it is traveling at or above a threshold speed.

Operationally, as illustrated in example 400, when the first cooling system assembly 404 is the leading cooling system and the speed of the vehicle 402 is above the threshold speed, the first channel 412 may be closed by the third cover 434 and the first cover 414 may be open and thereby allowing air to pass through the third channel 432. Fresh air from an environment outside of the vehicle 402 may be drawn into the first chamber 406 through the first opening 408. This is illustrated in FIG. 4 as the three arrows entering the first chamber 406 through the first opening 408. In some examples, the fresh air may be pulled into the first chamber 406 by activating the first fan 416. In some examples, the first fan 416 may pull the fresh air (as illustrated by three arrows behind the first fan 416) through the first chamber 406 and the first heat exchanger component 410 toward an inboard or distal end of the first cooling system assembly 404. In some examples, the first heat exchanger component 410 may be a radiator and may include one or more radiator pipes containing fluid (e.g., coolant) which may be at a hot temperature and one or more openings. In some examples, as the fresh air passes over the one or more pipes and through the one or more openings, the fresh air may lower the temperature of the fluid inside the one or more radiator pipes. In some examples, as a result, a temperature of the fresh air after passing through the first heat exchanger component 410 may become higher than a temperature of the fresh air from the environment outside and thereby air outboard or distal to the first heat exchanger component 410 may become heated air (e.g., the temperature of the fresh air at the arrows at the first opening 408 may be lower than the temperature of the heated air at the arrows outboard or distal the first fan 416). The heated air may enter the third channel 432 and exit the first cooling system assembly 404 to the environment outside of the vehicle 402. In some examples, alternatively or additionally, the first cooling system assembly 204 may further include one or more inboard or distal openings at the inboard or distal end of the first cooling system assembly 404 where the heated air may exit the first cooling system assembly 404 to the environment outside of the vehicle 402 and/or into a passenger cabin of the vehicle 402. In some examples, both the first cover 414 and the third cover 434 may be closed while the first cooling system assembly 404 is the leading cooling system and the vehicle 402 is traveling at or above the threshold speed. In some examples, the second cooling system assembly 418 may use the fresh air from outside of the vehicle 402 to lower the temperature of fluid at the second heat exchanger component 424 in the same or similar manner as the first cooling system assembly 404 while the second channel 426 is closed by the second cover 428.

In example 400, because the vehicle 402 is traveling in the direction toward the first end of the vehicle 402, a greater volume of air enters the first chamber 406 from an environment outside of the vehicle than at the second chamber 420 (illustrated by three arrows entering the first chamber 406 and one arrow entering the second chamber 420). In some examples, this may result in vehicle components associated with the first end of the vehicle 402 being sufficiently cooled and exhibiting minimum to no performance degradation while vehicle components associated with the second end of the vehicle 402 may be insufficiently cooled and thus exhibit greater performance degradation than the vehicle components associated with the first end of the vehicle 402. As a result, in order to provide sufficient airflow through the second cooling system assembly 418 to sufficiently cool the vehicle components at the second end of the vehicle 402, the fourth cover 438 may be positioned to close the fourth channel 436 and the second cover 428 may be moved from a first position wherein the second cover 428 is positioned to close the second channel 426 (e.g., the position of the first cover 214 illustrated in FIG. 2) to a second position wherein the second cover 428 is positioned to direct air into the second channel 426 (e.g., the position of the second cover 428 illustrated in FIG. 4). In some examples, the first channel 412, the second channel 426, the third channel 432, and/or the fourth channel 436 may direct fresh air from the under the vehicle 402 as illustrated in FIG. 4 into the first chamber 406, the second chamber 420, the outboard or distal side of the first cooling system assembly 404 and/or the outboard or distal end of the second cooling system assembly 418 respectively or direct air from the first chamber 406, the second chamber 420, the distal end of the first cooling system assembly 404, and/or the distal end of the second cooling system assembly 418 to the environment outside of the vehicle 402. In some examples, the first channel 412, the second channel 426, the third channel 432 and/or the fourth channel 436 may be located at a left side of the vehicle 402, a right side of the vehicle 402, or a top of the vehicle 402.

In some examples, rather than the first channel 412 and the second channel 426's respective openings being flush with a surface of the vehicle 402 as illustrated in FIG. 4, the first channel 412 and/or the second channel 426 may protrude from the surface of the vehicle 402. In some examples, rather than the first channel 412, the second channel 426, the third channel 432, and the fourth channel 436 having a uniform shape throughout as illustrated in FIG. 4, these channels may have openings associated with the first cover 414 and/or the second cover 428 that are larger than a size of the openings associated with an inside of the first cooling system assembly 404 and/or the second cooling system assembly 418, and the size of these channels may gradually narrows from the size of the openings associated with the first cover 414 and/or the second cover 428 to the size of the openings associated with the inside of the first cooling system assembly 404 and/or the inside of the second cooling system assembly 418.

In some examples, a speed of the first fan 416 and/or the second fan 430 may be adjusted to change the volume of fresh air entering into the first chamber 406 and/or the second chamber 420 respectively. In some examples, a direction of the first fan 416 and/or the second fan 430 may be reversed to push air inside the first cooling system assembly 404 and/or the second cooling system assembly 418 to the environment outside of the vehicle 402 via the first opening 408, the first channel 412, the second opening 422, and/or the second channel 426 respectively.

In some examples, the vehicle 402 may further include one or more ambient temperature sensors to detect the ambient temperature of the outside of the vehicle 402. In some examples, the first cooling system assembly 404 and/or the second cooling system assembly 418 may further include one or more temperature sensors configured to detect the temperature of the heated air inside the first cooling system assembly 404 and/or the second cooling system assembly 418 respectively inboard or distal of the first fan 416, the second fan 430, the first heat exchanger component 410, and/or the second heat exchanger component 424. In some examples, the one or more temperature sensor may be at or proximate the first heat exchanger component 410 and/or the second heat exchanger component 424 and configured to detect the temperature of the fluid in the first heat exchanger component 410 and/or the temperature of the fluid in the second heat exchanger component 324. In some examples, the temperature of the heated air and/or the temperature of the fluid at the first cooling system assembly 404 and/or at the second cooling system assembly 418 may be used to determine a thermal state associated with the first cooling system assembly 404 and/or a thermal state associated with the second cooling system assembly 418 respectively. In some examples, the first cooling system assembly 404 and/or the second cooling system assembly 418 may further include one or more airflow sensors configured to detect the volume of fresh air entering the first chamber 406 and/or the second chamber 420 from the environment outside of the vehicle 402.

In some examples, the second cover 428 may be coupled to an actuator configured to move the second cover 228 from the first position to the second position. In some examples, the actuator may be an active actuator or a passive actuator as described throughout this disclosure. In some examples, the second position of the second cover 428 may be a fixed angle wherein when the second cooling system assembly 418 is the trailing cooling system and the speed of the vehicle 402 meets or exceeds the threshold speed, the actuator is configured to always move the second cover 428 to the fixed angle. In some examples, the actuator may be configured to dynamically adjust the angle of the second position of the second cover 428 to fixed angles between the first position (e.g., 0 degrees) and a second angle (e.g. 90 degrees, 180 degrees, or the like) or to all angles between the first position and the second angle. In some examples, the angle of the second position may be determined based on the thermal state associated with second cooling system assembly 418. In some examples, the angle of the second position may be based on one or more threshold thermal states. In some examples, the angle of the second position may be adjusted between a first thermal state angle associated with a first threshold thermal state and a second thermal state angle associated with a second thermal state wherein the first thermal state angle is more acute than the second thermal state angle (e.g., closer to 0 degrees (the first position) than the second thermal state angle) and the first thermal state is associated with a lower temperature than the second thermal state. In some examples, the angle of the second position of the second cover 428 may be adjusted based on the ambient temperature and/or whether the ambient temperature meets or exceeds one or more threshold ambient temperatures. In some examples, the first cover 414 may also include an actuator and that actuator may be configured to move the first cover 414 in the same or similar way as described with respect to the second cover 428.

In some examples, the third cover 434 may include an actuator configured to move the third cover 434 between a first position and a second position. In some example, when the third cover 434 is in the first position, the third cover 434 closes the first channel 412 and opens the third channel 432, and when the third cover is in the second position, the third cover 434 opens the first channel 412 and closes the third channel 432. Example 400 illustrates the third cover 434 in the first position. In some examples, the actuator associated with the third cover 434 may be an a same or a similar actuator as the other actuators described throughout this disclosure.

In some examples, the fourth cover 438 may include an actuator configured to move the fourth cover 438 between a first position and a second position. In some examples, when the fourth cover 438 is in the first position, the fourth cover 438 closes the second channel 426 and opens the fourth channel 436, and when the fourth cover 438 is in the second position, the fourth cover 438 opens the second channel 426 and closes the fourth channel 436. Example 400 illustrates the fourth cover 438 in the second position. In some examples, the actuator associated with the fourth cover 438 may be a same or a similar actuator as the other actuators described throughout this disclosure.

In some examples, the speed of the first fan 416 and/or the second fan 430 may be adjusted based on whether the first cooling system assembly 404 is the leading cooling system or whether second cooling system assembly 418 is the leading cooling system. For example, because the second cooling system assembly 418 is the trailing cooling system and thus would have less volume of fresh air passively entering the second chamber 420 than the volume of fresh air passively entering the first chamber 406, the speed of the second fan 230 may be adjusted be higher than the speed of the first fan 416. In some examples, the speed of the first fan 416 and/or the second fan 430 may be adjusted based on whether the volume of the fresh air detected by the one or more airflow sensors exceeds one or more threshold airflow volume. In some examples, the speed of the first fan 416 and/or the second fan 430 may be adjusted based on the thermal state associated with the first cooling system assembly 404 and/or the thermal state associated with the second cooling system assembly 418 and may further be based on whether the thermal state associated with the first cooling system assembly 404 and/or the thermal state associated with the second cooling system assembly 418 meets or exceeds one or more threshold thermal states. In some examples, the threshold thermal state(s) associated with the fans may be the same as the threshold thermal state(s) associated with the covers. In some examples, the threshold thermal state(s) associated with the fans may be different than the threshold thermal state(s) associated with the covers.

In some examples, the vehicle 402 may be a bidirectional vehicle, thereby may travel in a direction opposite the direction of travel illustrated in Example 400 without turning the vehicle 402 around (e.g., the second end of the vehicle 402 becomes the leading end and the first end of the vehicle 402 becomes the trailing end). In the example where the vehicle 402 is traveling in the direction opposite the direction of travel illustrated in Example 400, the second cooling system assembly 418 would become the leading cooling system and the first cooling system assembly 404 would become the trailing cooling system. In such a scenario, the second cooling system assembly 418, as the leading cooling system, would operate in a same or similar manner as the first cooling system assembly 404 as described above and the first cooling system assembly 404, as the trailing cooling system, would operate in a same or similar manner as the second cooling system assembly 418 as described above.

Figure 5:
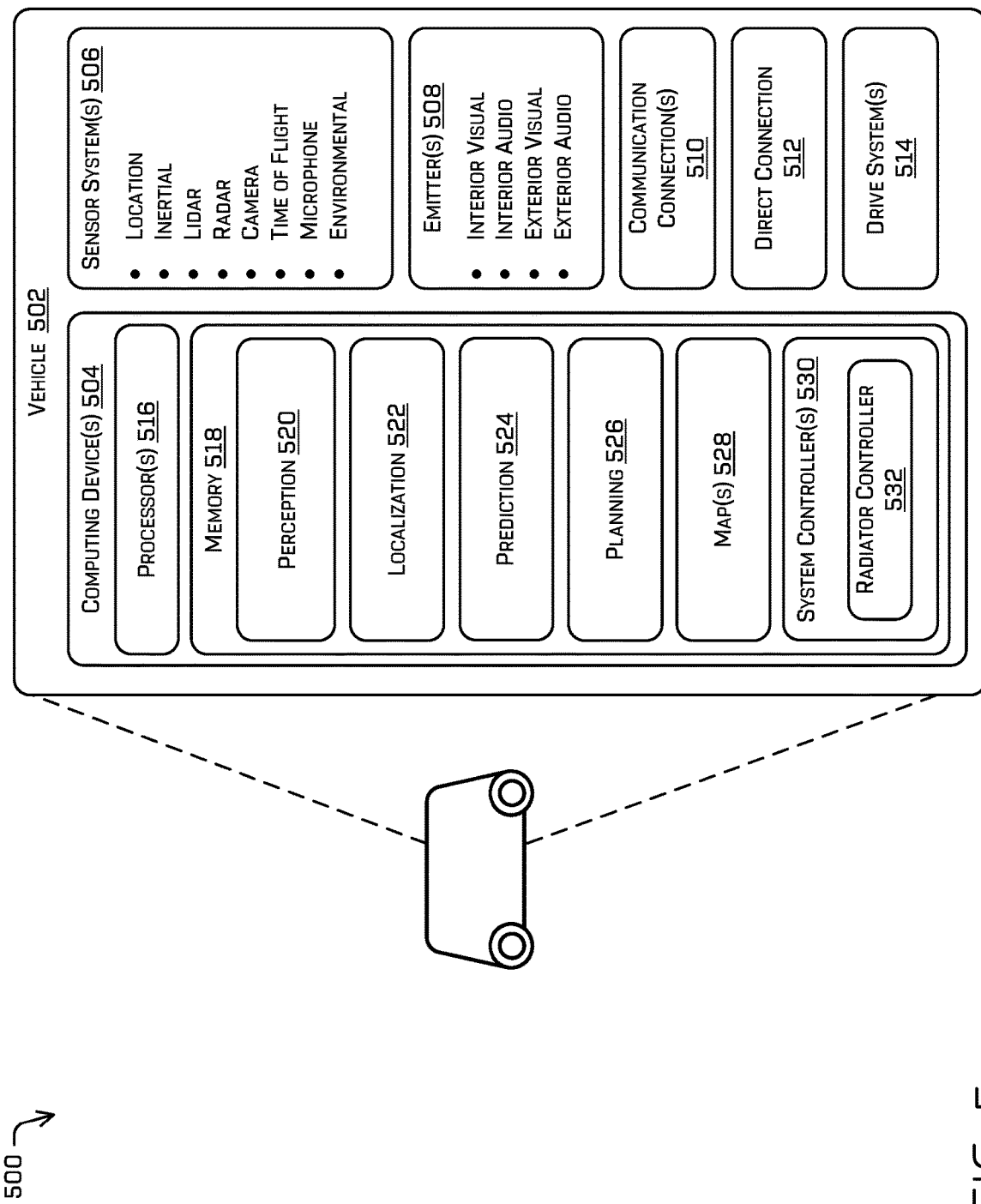
FIG. 5 depicts a block diagram of an example system for implementing the techniques described herein.

FIG. 5 depicts a block diagram of an example system 500 for implementing the techniques described herein. In at least one example, the system 500 may include a vehicle 502. In the illustrated example system 500, the vehicle 502 is an autonomous vehicle; however, the vehicle 502 may be any other type of vehicle.

In some examples, the vehicle 502 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 may be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 may be configured to capture sensor data associated with an environment.

The one or more sensor system(s) 506 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 may include multiple instances of each of these or other types of sensors. For instance, the time-of-flight sensors may include individual time-of-flight sensors located at the corners, front, back, sides, and/or top of the vehicle 502. As another example, the camera sensors may include multiple cameras disposed at various locations about the exterior and/or interior of the vehicle 502. The one or more sensor system(s) 506 may provide input to the computing device 504.

The vehicle 502 may also include one or more emitter(s) 508 for emitting light and/or sound. The one or more emitter(s) 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), or the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include one or more communication connection(s) 510 that enable communication between the vehicle 502 and one or more other local or remote computing device(s) (e.g., a remote teleoperation computing device) or remote services. For instance, the one or more communication connection(s) 510 may facilitate communication with other local computing device(s) on the vehicle 502 and/or the one or more drive system(s) 514. Also, the one or more communication connection(s) 510 may allow the vehicle 502 to communicate with other nearby computing device(s) (e.g., other nearby vehicles, traffic signals, etc.).

The one or more communications connection(s) 510 may include physical and/or logical interfaces for connecting the computing device 504 to another computing device or one or more external networks (e.g., the Internet). For example, the one or more communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 may include one or more drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor system(s) 506 to detect conditions of the drive system(s) 514 and/or the surroundings of the vehicle 502. By way of example and not limitation, the sensor system(s) 506 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) 506 on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) 506 and to control operation of the various vehicle systems. In some examples, the drive system controller may include one or more processor(s) and memory communicatively coupled with the one or more processor(s). The memory may store one or more components to perform various functionalities of the drive system(s) 514. Furthermore, the drive system(s) 514 also include one or more communication connection(s) that enable communication by the respective drive system with one or more other local or remote computing device(s).

The computing device 504 may include one or more processor(s) 516 and memory 518 communicatively coupled with the one or more processor(s) 516. In the illustrated example, the memory 518 of the computing device 504 stores a perception component 520, a localization component 522, a prediction component 524, a planning component 526, a maps component 528, and one or more system controller(s) 532 comprising a radiator controller 532. Though depicted as residing in the memory 518 for illustrative purposes, it is contemplated that the perception component 520, the localization component 522, the prediction component 524, the planning component 526, the maps component 528, the one or more system controller(s) 530, and the radiator controller 532 may additionally, or alternatively, be accessible to the computing device 504 (e.g., stored in a different component of vehicle 502) and/or be accessible to the vehicle 502 (e.g., stored remotely).

The perception component 520 may include functionality to perform object detection, segmentation, and/or classification. In some examples, the perception component 520 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

Further, the perception component 520 may include functionality to store perception data generated by the perception component 520. In some instances, the perception component 520 may determine a track corresponding to an object that has been classified as an object type. For purposes of illustration only, the perception component 520, using sensor system(s) 506 may capture one or more images of an environment. The sensor system(s) 506 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 522 may include functionality to receive data from the sensor system(s) 506 and/or other components to determine a position of the vehicle 502. For example, the localization component 522 may include and/or request/receive a three-dimensional map of an environment and may continuously determine a location of the autonomous vehicle within the map. In some instances, the localization component 522 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, or the like to accurately determine a location of the autonomous vehicle. In some instances, the localization component 522 may provide data to various components of the vehicle 502 to determine an initial position of an autonomous vehicle for generating a trajectory, as discussed herein.

The prediction component 524 may generate one or more probability maps representing prediction probabilities of possible locations of one or more objects in an environment. For example, the prediction component 524 may generate one or more probability maps for vehicles, pedestrians, animals, or the like within a threshold distance from the vehicle 502. In some instances, the prediction component 524 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 526 may determine a path for the vehicle 502 to follow to traverse through an environment. For example, the planning component 526 may determine various routes and paths and various levels of detail. In some instances, the planning component 526 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 526 may alternatively, or additionally, use data from the perception component 520 and/or the prediction component 524 to determine a path for the vehicle 502 to follow to traverse through an environment. For example, the planning component 526 may receive data from the perception component 520 and/or the prediction component 524 regarding objects associated with an environment. Using this data, the planning component 526 may determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. A map may further include an object identifier, an object classification, a three-dimensional location, covariance data (e.g., represented in image data or a multi-resolution voxel space), or the like. In some instances, a map may include, but is not limited to: texture information (e.g., color information (e.g., RGB color information, Lab color information, HSV/HSL color information), or the like), intensity information (e.g., LIDAR information, RADAR information, or the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, or the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 528 may include at least one map (e.g., images and/or a mesh). In some examples, the vehicle 502 may be controlled based at least in part on the map(s) 528. That is, the map(s) 528 may be used in connection with the perception component 520 (and sub-components), the localization component 522 (and sub-components), the prediction component 524, and/or the planning component 526 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 may include one or more system controller(s) 530, which may be configured to control steering, propulsion, braking, safety, emitters, communication, and other systems of the vehicle 502. These system controller(s) 530 may communicate with and/or control corresponding systems of the drive system(s) 514 and/or other components of the vehicle 502, which may be configured to operate in accordance with a path provided from the planning component 526.

In at least one example, one or more system controller(s) 530 may include a radiator controller 532. The radiator controller 532 control one or more cooling system assemblies associated with the vehicle 502 described in FIGS. 1-4 as well as throughout this disclosure.

The processor(s) 516 of the computing device 504 may be any suitable processor capable of executing instructions to process data and perform operations as described herein. By way of example and not limitation, the processor(s) 516 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 may be a non-transitory computer-readable media. The memory 518 may store an operating system and one or more software applications, instructions, programs, and/or data to implement the methods described herein and the functions attributed to the various systems. In various implementations, the memory 518 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying Figures are merely examples that are related to the discussion herein.

In some instances, aspects of some or all of the components discussed herein may include any models, algorithms, and/or machine-learning algorithms. For example, in some instances, the components in the memory 518 may be implemented as a neural network.

In some examples, the neural network may train a machine learned model that may determine a condition of one or more vehicle components such as a condition of a tire. The neural network may receive a reference data set of images of tires labeled with new tire conditions and training data sets of images of tires labeled based on one or more tire conditions. The training data sets may include images of tires at different types of tire conditions and a different wear levels of each particular tire condition. In some examples, the label may be tread depth. The images may be indicative of different levels of wear of the tire such each with different level of tread depths that are indicative of gradual wear of the tire. In some examples, the label may be distance traveled by the tire. In some examples, the label may be other types of tire wear such as puncture, uneven wear, and/or mis-alignment of tire. In some examples, vehicle 502 may determine the condition of the tire based on the machine learned model. In some examples, the neural network may train machine learned models to determine wear levels of different conditions of other vehicle components (e.g., motor, brakes, suspensions, drivetrain, joints, sensors, and/or the like).

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, or the like.

Figure 6:
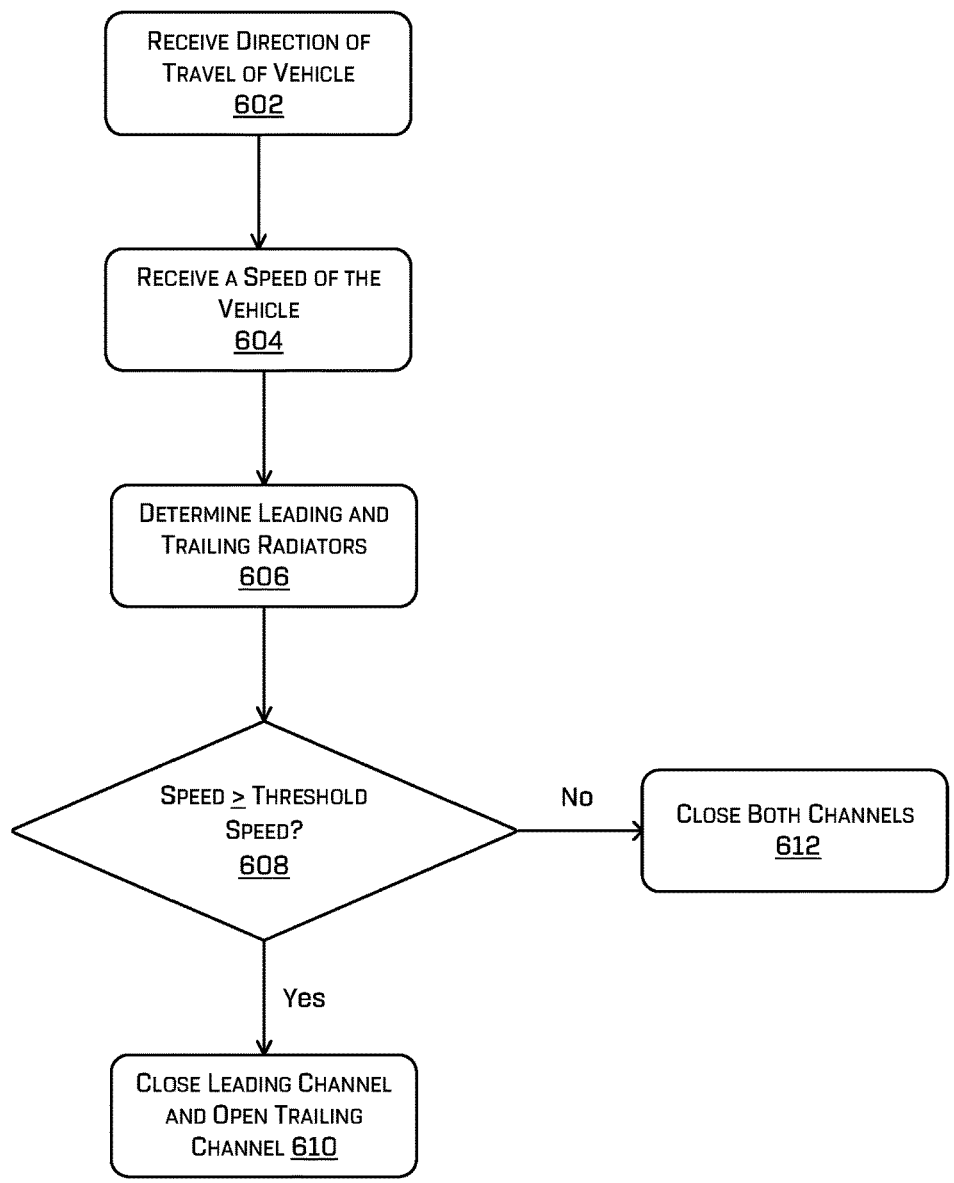
FIG. 6 is an example process for operating a leading and/or a trailing cooling system assembly of a vehicle.

FIGS. 1 and 6 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, or the like that perform particular functions or implement particular abstract data types. The order in which the operations are described is not intended to be construed as a limitation, and any number of the described operations may be omitted or combined in any order and/or in parallel to implement the processes.

FIG. 6 illustrates an example process 600 for operating a leading and/or a trailing cooling system assemblies of a vehicle. For example, some or all of the process 600 may be performed by one or more components in FIG. 5, as described herein. For example, some or all of the process 600 may be performed by radiator controller 532 within the system controllers 530.

At operation 602, the process may include receiving a direction of travel of a vehicle. Additional details associated with operation 602 are discussed in connection with FIGS. 1-4, as well as throughout this disclosure.

At operation 604, the process may include receiving a speed of the vehicle. Additional details associated with operation 604 are discussed in connection with FIGS. 1-4, as well as throughout this disclosure.

At operation 606, the process may include determining a leading cooling system (also referred to as a leading radiator) and a trailing cooling system (also referred to as a trailing radiator). In some examples, the leading cooling system and the trailing cooling system may be determined based on the direction of travel of the vehicle. Additional details associated with operation 606 are discussed in connection with FIGS. 1-4, as well as throughout this disclosure.

At operation 608, the process may include determining whether the speed of the vehicle meets or exceeds a threshold speed. If the speed meets or exceeds the threshold speed, the process proceeds to operation 610. If the speed of the vehicle does not meet or exceed the threshold speed (e.g., the speed of the vehicle is lower than the threshold speed), then the process proceeds to operation 612. Additional details associated with operation 608 are discussed in connection with FIGS. 1-4, as well as throughout this disclosure.

At operation 610, the process can include closing a channel associated with the leading cooling system and opening a channel associated with the trailing cooling system. Additional details associated with operation 610 are discussed in connection with FIGS. 1-4, as well as throughout this disclosure.

At operation 612, the process can include closing the channel associated with the leading cooling system and closing the channel associated with the trailing cooling system. Additional details associated with operation 612 are discussed in connection with FIGS. 1-4, as well as throughout this disclosure.

Example Clauses

A: A vehicle comprising: a vehicle body; a radiator disposed proximate a first end of the vehicle body; an opening formed in the vehicle body at the first end of the vehicle proximate the radiator and configured to allow air to pass between an environment outside of the vehicle body and the radiator; a channel configured to direct air from under the vehicle body to a position at a proximal side of the radiator of the vehicle; a cover coupled to the channel and configured to move between a first position restricting air from passing through the channel and a second position permitting passage of the air through the channel; and an actuator coupled to the cover and configured to: position the cover in the first position to restrict air from entering the channel when the vehicle travels in a first direction in which the first end of the vehicle is a leading end or while the vehicle is below a threshold speed, and position the cover in the second position permitting passage of air through the channel when the vehicle travels in a second direction in which the first end of the vehicle is a trailing end of the vehicle or while the vehicle is at or above the threshold speed.

B: The vehicle of paragraph A, wherein the radiator is a first radiator, the channel is a first channel, the cover is a first cover, and the actuator is a first actuator, the vehicle further comprising: a second radiator disposed proximate a second end of the vehicle; a second opening formed in the vehicle body at the second end of the vehicle proximate the second radiator and configured to allow air to pass between an environment outside of the vehicle body and the second radiator; a second channel configured to direct the air from under the vehicle body to a position at a proximal side of the second radiator of the vehicle; a second cover coupled to the second channel and configured to move between a first position restricting air from passing through the second channel and a second position permitting passage of air through the second channel; and a second actuator coupled to the second cover and configured to: position the second cover in the first position to restrict the air from entering the channel when the vehicle travels in the second direction in which the second end is the leading end of the vehicle or while the vehicle is below the threshold speed, and position the second cover in the second position permitting passage of air through the second channel when the vehicle travels in the first direction in which the second end of the vehicle is the trailing end of the vehicle or while the vehicle is at or above the threshold speed.

C: The vehicle of paragraph A or B, wherein the channel is a first channel, the cover is a first cover, and the actuator is a first actuator, the vehicle further comprising: a second channel configured to direct the air from under the vehicle body to a position at a distal side of the radiator or air from the distal side of the radiator to a position under the vehicle body; a second cover coupled to the first channel and the second channel and configured to move between a first position restricting air from passing through the first channel and permitting passage of air through the second channel and a second position permitting passage of air through the first channel and restricting air from passing through the second channel; and a second actuator coupled to the second cover and configured to: position the second cover in the first position to restrict air from entering the first channel and permit passage of air through the second channel when the vehicle travels in the first direction in which the first end of the vehicle is the leading end or while the vehicle is below the threshold speed, and position the second cover in the second position permitting passage of air through the first channel and restrict air from entering the second channel when the vehicle travels in the second direction in which the first end of the vehicle is the trailing end of the vehicle or while the vehicle is at or above the threshold speed.

D: The vehicle of any of paragraphs A-C, further comprising a fan, wherein the fan is configured to pull the air from the environment outside of the vehicle body through the opening to a position at a distal side of the radiator or the air from under the vehicle body through the channel to the position at the distal side of the radiator.

E: The vehicle of any of paragraphs A-D, further comprising: a first sensor configured to determine a temperature of coolant associated with the radiator or an ambient temperature of the environment; a second sensor configured to determine a volume of air passing through the opening; and wherein the actuator is further configured to adjust an angle associated with the second position of the cover based at least in part on at least one of: the temperature of the coolant associated with the radiator; the ambient temperature of the environment; or the volume of the air passing through the opening.

F: A method comprising: receiving a direction of travel of a vehicle in an environment; determining, based at least in part on the direction of travel of the vehicle, that a radiator disposed at a first end of the vehicle is a trailing radiator; moving, based at least in part on determining that the radiator is a trailing radiator, a cover coupled to a channel from a first position restricting air from passing through the channel to a position proximate the radiator to a second position permitting passage of air through the channel to the position proximate the radiator.

G: The method of paragraph F, further comprising: receiving a speed of the vehicle; moving the cover coupled to the channel from the first position to the second position based on the speed of the vehicle meeting or exceeding a threshold speed.

H: The method of paragraph F or G, wherein the channel is a first channel, the cover is a first cover, and wherein the radiator is a first radiator, the method further comprising: determining, based at least in part on the direction of travel of the vehicle, that a second radiator disposed at a second end of the vehicle is a leading radiator; and moving, based at least in part on determining that the second radiator is the leading radiator, a second cover coupled to a second channel from a second position permitting passage of air through the second channel to a first position restricting air from passing through the second channel.

I: The method of any of paragraphs F-H, wherein an actuator is coupled to the cover and is configured to: position the cover in the first position to restrict air from entering the channel when the vehicle travels in a first direction in which the first end of the vehicle is a leading end or while the vehicle is below a threshold speed, and position the cover in the second position permitting passage of air through the channel when the vehicle travels in a second direction in which the first end of the vehicle is a trailing end of the vehicle or while the vehicle is at or above the threshold speed.

J: The method of any of paragraphs F-I, wherein the position proximate the radiator is a position at a proximal side of the radiator; and wherein the channel is configured to direct air from under a body of the vehicle to the position.

K: The method of paragraph J, wherein the channel is a first channel and the cover is a first cover, the method further comprises: moving, based at least in part on determining that the radiator is the trailing radiator, a second cover coupled to the first channel and a second channel from a first position restricting air from passing through the first channel and permitting passage of air through the second channel to a second position permitting passage of air through the first channel and restricting air from passing through the second channel.

L: The method of paragraph K, wherein the second channel is configured to direct air from under a body of the vehicle to a position at a distal side of the radiator or direct air from the distal side of the radiator to a position under the body of the vehicle.

M: The method of any of paragraphs F-L, wherein the position is a position at a distal side of the radiator; and wherein the channel is configured to direct air from under a body of the vehicle to the position.

N: The method of any of paragraphs F-M, the method further comprising activating a fan to pull air to the position proximate the radiator from at least one of: an environment outside the vehicle and passing through an opening formed at a proximal end of the radiator, or under a body of the vehicle and passing through the channel.

O: The method of any of paragraphs F-N, further comprising: determining a temperature of coolant associated with the radiator; determining an ambient temperature of an environment outside of the vehicle; determine a volume of air passing through an opening formed at a proximal end of the radiator; and adjusting an angle associated with the second position of the cover based at least in part on at least one of: the temperature of the coolant associated with the radiator; the ambient temperature of the environment outside of the vehicle; or the volume of the air passing through the opening.

P: A cooling system assembly comprising: a channel configured to direct air from an environment outside the cooling system assembly to a position proximate a heat exchanger component of the cooling system assembly; a cover coupled to the channel and configured to move between a first position restricting air from passing through the channel and a second position permitting passage of the air through the channel; and an actuator coupled to the cover and configured to: position the cover in the first position to restrict air from entering the channel when the cooling system assembly is disposed proximate a first end of a vehicle, wherein the first end of the vehicle is a leading end of the vehicle, and position the cover in the second position permitting passage of air through the channel when the cooling system assembly is disposed proximate the first end of the vehicle, wherein the first end of the vehicle is a trailing end of the vehicle.

Q: The cooling system assembly of paragraph P, wherein the position proximate the heat exchanger component of the cooling system assembly is a position at a proximal side of the heat exchanger component.

R: The cooling system assembly of paragraph Q, wherein the channel is a first channel and configured to direct air from under the vehicle to the position at the proximal side of heat exchanger of the cooling system assembly, the cooling system assembly further comprising: a second channel configured to direct the air from under the vehicle to a position at a distal side of heat exchanger component of the cooling system assembly or air from the distal side of heat exchanger component of the cooling system assembly to a position under the vehicle.

S: The cooling system assembly of paragraph R, wherein the cover is a first cover, and the actuator is a first actuator, the cooling system assembly further comprising: a second cover coupled to the first channel and the second channel and configured to move between a first position restricting air from passing through the first channel and permitting passage of air through the second channel and a second position permitting passage of air through the first channel and restricting air from passing through the second channel; and a second actuator coupled to the second cover and configured to: position the second cover in the first position to restrict air from entering the first channel and permit passage of air through the second channel when the cooling system assembly is disposed proximate a first end of a vehicle, wherein the first end of the vehicle is a leading end of the vehicle or while the vehicle is below a threshold speed, and position the second cover in the second position permitting passage of air through the first channel and restrict air from entering the second channel when the cooling system assembly is disposed proximate the first end of the vehicle, wherein the first end of the vehicle is a trailing end of the vehicle or while the vehicle is at or above the threshold speed.

T: The cooling system assembly of any of paragraphs P-S, wherein the actuator is further configured to: position the cover in the first position to restrict air from entering the channel while a speed of the vehicle is below a threshold speed, and position the cover in the second position permitting passage of air through the channel while the speed of the vehicle is at or above the threshold speed.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a vehicle body;
   a first radiator disposed proximate a first end of the vehicle body;
   a first opening formed in the vehicle body at the first end of the vehicle proximate the first radiator and configured to allow air to pass between an environment outside of the vehicle body and the first radiator;
   a first channel configured to direct air from under the vehicle body to a position at a proximal side of the first radiator of the vehicle;
   a second radiator disposed proximate a second end of the vehicle body, the second end opposite the first end;
   a second opening formed in the vehicle body at the second end of the vehicle proximate the second radiator and configured to allow air to pass between the environment and the second radiator;
   a second channel configured to direct air from under the vehicle body to a position at a proximal side of the second radiator of the vehicle;
   a cover coupled to the first channel and configured to move between a first position restricting air from passing through the first channel and a second position permitting passage of the air through the first channel; and
   an actuator coupled to the cover and configured to:
      position the cover in the first position to restrict air from entering the first channel when the vehicle travels in a first direction in which the first end of the vehicle is a leading end, and
      position the cover in the second position permitting passage of air through the first channel when the vehicle travels in a second direction in which the first end of the vehicle is a trailing end of the vehicle.

2. The vehicle of claim 1, wherein the cover is a first cover, and the actuator is a first actuator, the vehicle further comprising:

a second cover coupled to the second channel and configured to move between a first position restricting air from passing through the second channel and a second position permitting passage of air through the second channel; and a second actuator coupled to the second cover and configured to:
  position the second cover in the first position to restrict the air from entering the second channel when the vehicle travels in the second direction in which the second end is the leading end of the vehicle or while the vehicle is below a threshold speed, and
  position the second cover in the second position permitting passage of air through the second channel when the vehicle travels in the first direction in which the second end of the vehicle is the trailing end of the vehicle or while the vehicle is at or above the threshold speed.

3. The vehicle of claim 1, wherein the cover is a first cover, and the actuator is a first actuator, the vehicle further comprising:
  a second cover coupled to the first channel and the second channel and configured to move between a first position restricting air from passing through the first channel and permitting passage of air through the second channel and a second position permitting passage of air through the first channel and restricting air from passing through the second channel; and
  a second actuator coupled to the second cover and configured to:
    position the second cover in the first position to restrict air from entering the first channel and permit passage of air through the second channel when the vehicle travels in the first direction in which the first end of the vehicle is the leading end or while the vehicle is below a threshold speed, and
    position the second cover in the second position permitting passage of air through the first channel and restrict air from entering the second channel when the vehicle travels in the second direction in which the first end of the vehicle is the trailing end of the vehicle or while the vehicle is at or above the threshold speed.

4. The vehicle of claim 1, further comprising a fan, wherein the fan is configured to pull the air from the environment outside of the vehicle body through the first opening to a position at a distal side of the first radiator or the air from under the vehicle body through the first channel to the position at the distal side of the first radiator.

5. The vehicle of claim 1, further comprising:
  a first sensor configured to determine a temperature of coolant associated with the first radiator or an ambient temperature of the environment; and
  a second sensor configured to determine a volume of air passing through the first opening; and
  wherein the actuator is further configured to adjust an angle associated with the second position of the cover based at least in part on at least one of:
    the temperature of the coolant associated with the first radiator;
    the ambient temperature of the environment; or
    the volume of the air passing through the first opening.

6. A cooling system comprising:
  a first channel configured to direct air from an environment under a vehicle outside the cooling system to a position proximate a first heat exchanger component of the cooling system, wherein the first heat exchanger component is disposed proximate a first end of a vehicle;
  a second channel configured to direct air from the environment under the vehicle outside the cooling system to a position proximate a second heat exchanger component of the cooling system, wherein the second heat exchanger component is disposed proximate a second end of the vehicle opposite the first end;
  a first opening at the first end of the vehicle proximate the first heat exchanger component and configured to allow air to pass between the environment and the first heat exchanger component;
  a second opening at the second end of the vehicle proximate the second heat exchanger component and configured to allow air to pass between the environment and the second heat exchanger component;
  a cover coupled to the first channel and configured to move between a first position restricting air from passing through the first channel and a second position permitting passage of the air through the first channel; and
  an actuator coupled to the cover and configured to:
    position the cover in the first position to restrict air from entering the first channel when the first end of the vehicle is a leading end of the vehicle, and position the cover in the second position permitting passage of air through the first channel when the first end of the vehicle is a trailing end of the vehicle.

7. The cooling system of claim 6, wherein the position proximate the first heat exchanger component of the cooling system is a position at a proximal side of the first heat exchanger component.

8. The cooling system of claim 7, further comprising:
  a third channel configured to direct the air from under the vehicle to a position at a distal side of the first heat exchanger component of the cooling system or air from the distal side of the first heat exchanger component of the cooling system to a position under the vehicle.

9. The cooling system of claim 8, wherein the cover is a first cover, and the actuator is a first actuator, the cooling system further comprising:
  a second cover coupled to the first channel and the third channel and configured to move between a first position restricting air from passing through the first channel and permitting passage of air through the third channel and a second position permitting passage of air through the first channel and restricting air from passing through the third channel; and
  a second actuator coupled to the second cover and configured to:
    position the second cover in the first position to restrict air from entering the first channel and permit passage of air through the third channel when the first end of the vehicle is the leading end of the vehicle or while the vehicle is below a threshold speed, and
    position the second cover in the second position permitting passage of air through the first channel and restricting air from entering the third channel when the first end of the vehicle is the trailing end of the vehicle or while the vehicle is at or above the threshold speed.

10. The cooling system of claim 6, wherein the actuator is further configured to:
  position the cover in the first position to restrict air from entering the first channel while a speed of the vehicle is below a threshold speed, and position the cover in the second position permitting passage of air through the first channel while the speed of the vehicle is at or above the threshold speed.

11. A method comprising:
positioning, by an actuator at a first time, a cover in a first position to restrict air from entering a first channel of a first cooling system disposed proximate a first end of a vehicle when the first end is a leading end of the vehicle at the first time, wherein:
  a first radiator is disposed proximate the first end of the vehicle;
  a second radiator is disposed proximate a second end of the vehicle opposite the first end;
  a first opening at the first end of the vehicle proximate the first radiator and configured to allow air to pass between an environment and the first radiator;
  a second opening at the second end of the vehicle proximate the second radiator and configured to allow air to pass between the environment and the second radiator;
  the first channel is configured to direct air from the environment under the vehicle outside the first cooling system assembly to a position proximate the first radiator of the first cooling system assembly;
  a second channel is configured to direct air from the environment under the vehicle outside a second cooling system assembly disposed proximate the second end of the vehicle to a position proximate the second radiator of the second cooling system assembly; and
  the cover is coupled to the first channel and configured to move between a first position restricting air from passing through the first channel and a second position permitting passage of the air through the first channel; and
positioning, by the actuator at a second time, the cover in the second position permitting passage of air through the first channel when the first end of the vehicle is a trailing end of the vehicle at the second time.

12. The method of claim 11, wherein the cover is a first cover, and the actuator is a first actuator, the method further comprising:
  positioning, by a second actuator, a second cover in a first position to restrict the air from entering the second channel when the vehicle travels in a second direction in which the second end is the leading end of the vehicle or while the vehicle is below a threshold speed, wherein the second cover is coupled to the second channel and configured to move between a first position restricting air from passing through the second channel and a second position permitting passage of air through the second channel; and
  positioning, by the second actuator, the second cover in the second position permitting passage of air through the second channel when the vehicle travels in a first direction in which the second end of the vehicle is the trailing end of the vehicle or while the vehicle is at or above the threshold speed.

13. The method of claim 11, wherein the cover is a first cover, and the actuator is a first actuator, the method further comprising:
  positioning, by a second actuator, a second cover in a first position to restrict air from entering the first channel and permit passage of air through a third the second channel when the vehicle travels in a first direction in which the first end of the vehicle is the leading end or while the vehicle is below a threshold speed; and
  positioning, by the second actuator, the second cover in the second position permitting passage of air through the first channel and restricting air from entering the third channel when the vehicle travels in a second direction in which the first end of the vehicle is the trailing end of the vehicle or while the vehicle is at or above the threshold speed.

14. The method of claim 11, wherein a fan is configured to pull the air from the environment outside of the vehicle through the first opening to a position at a distal side of the first radiator or the air from under the vehicle through the first channel to the position at the distal side of the first radiator.

15. The method of claim 14, further comprising:
  receiving first sensor data associated with a temperature of coolant associated with the first radiator or an ambient temperature of the environment;
  receiving second sensor data associated with a volume of air passing through the first opening; and
  adjusting, by the actuator, an angle associated with the second position of the cover based at least in part on at least one of:
    the temperature of coolant associated with the first radiator;
    the ambient temperature of the environment; or
    the volume of the air passing through the first opening.

16. The method of claim 11, wherein the position proximate the first radiator is a position at a proximal side of the first radiator.

17. The method of claim 11, further comprising:
  controlling the actuator to position the cover in the first position to restrict air from entering the first channel while a speed of the vehicle is below a threshold speed; and
  controlling the actuator to position the cover in the second position permitting passage of air through the first channel while the speed of the vehicle is at or above the threshold speed.

* * * * *